United States Patent
Holenstein et al.

(10) Patent No.: US 10,671,641 B1
(45) Date of Patent: Jun. 2, 2020

(54) METHOD AND COMPUTER PROGRAM PRODUCT FOR EFFICIENTLY LOADING AND SYNCHRONIZING COLUMN-ORIENTED DATABASES

(71) Applicant: Gravic, Inc., Malvern, PA (US)

(72) Inventors: Paul J. Holenstein, Downingtown, PA (US); John R. Hoffmann, Kennett Square, PA (US); Bruce D. Holenstein, Media, PA (US); Wilbur H. Highleyman, Blairstown, NJ (US)

(73) Assignee: Gravic, Inc., Malvern, PA (US)

( * ) Notice: Subject to any disclaimer, the term of this patent is extended or adjusted under 35 U.S.C. 154(b) by 314 days.

(21) Appl. No.: 15/137,643

(22) Filed: Apr. 25, 2016

(51) Int. Cl.
*G06F 16/22* (2019.01)
*G06F 16/23* (2019.01)
*G06F 16/27* (2019.01)
*G06F 16/16* (2019.01)
*G06F 16/28* (2019.01)

(52) U.S. Cl.
CPC ......... *G06F 16/275* (2019.01); *G06F 16/162* (2019.01); *G06F 16/22* (2019.01); *G06F 16/221* (2019.01); *G06F 16/2358* (2019.01); *G06F 16/2365* (2019.01); *G06F 16/284* (2019.01); *G06F 2201/84* (2013.01)

(58) Field of Classification Search
CPC ........... G06F 17/3028; G06F 17/30575; G06F 16/22; G06F 16/2365; G06F 2201/84
USPC ....................................................... 707/610
See application file for complete search history.

(56) References Cited

U.S. PATENT DOCUMENTS

| | | | |
|---|---|---|---|
| 6,122,630 A | 9/2000 | Strickler et al. | |
| 6,745,209 B2 | 6/2004 | Holenstein et al. | |
| 8,271,430 B2 * | 9/2012 | Willson | G06F 17/30563 707/602 |
| 2014/0052690 A1 * | 2/2014 | Kamireddy | G06F 16/2386 707/624 |
| 2014/0229423 A1 * | 8/2014 | Bengali | G06F 17/30563 707/602 |
| 2016/0179836 A1 * | 6/2016 | Guo | G06F 16/2282 707/692 |

* cited by examiner

*Primary Examiner* — Marcin R Filipczyk
(74) *Attorney, Agent, or Firm* — Panitch Schwarze Belisario & Nadel LLP

(57) ABSTRACT

An automated method and computer program product are provided for synchronizing a column-oriented target database with a row-oriented source database. Change data are replicated from a change log of the row-oriented source database via a staging database to the column-oriented target database. The change data including inserts and deletes. Change data of the change log is read into the staging database and is consolidated and grouped into a consolidated grouping of inserts, and a consolidated grouping of deletes. The consolidated grouping of inserts from the staging database are applied to the target database in a batched manner, and the consolidated grouping of deletes from the staging database are applied to the target database in a batched manner.

20 Claims, 19 Drawing Sheets

Updating a Column-Oriented Staging Database – Preserving Updates

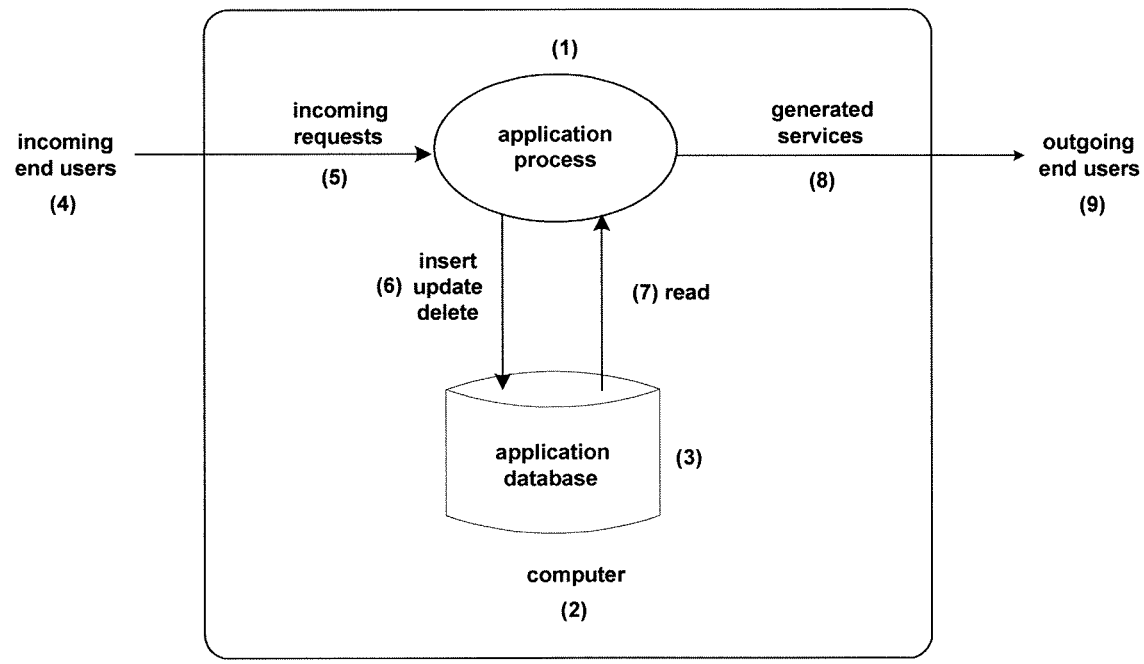
Figure 1: Prior Art - A Computer Application
| | name | dept | salary | age | sex |
|---|---|---|---|---|---|
| | Arons, J. | sales | 30,500 | 31 | m |
| (1) row (entity) → | Franks, M. | admin | 27,000 | 43 | m |
| | Holmes, P. | sales | 33,600 | 41 | f |
| | Smith, G. | engineering | 74,500 | 52 | m |
| | Yates, B. | production | 22,300 | 22 | f |
Figure 2: Prior Art - A Database Table

| oid | pid | date | cid | quantity | price |
|---|---|---|---|---|---|
| 73 | 437 | 6/17/14 | fm19 | 1 | 110 |
| 74 | 215 | 6/22/14 | dl52 | 5 | 3,045 |
| 74 | 556 | 6/22/14 | dl52 | 3 | 982 |
| 74 | 723 | 6/22/14 | dl52 | 6 | 24 |
| 75 | 478 | 6/22/14 | yv51 | 11 | 385 |
| 76 | 389 | 6/25/14 | fm19 | 4 | 226 |

Figure 3: Prior Art - Row-Oriented Sales Table

| oid | pid | date | cid | quantity | price |
|---|---|---|---|---|---|
| 73 | 437 | 6/17/14 | fm19 | 1 | 110 |
| 74 | 215 | 6/22/14 | dl52 | 5 | 3,045 |
| 74 | 556 | 6/22/14 | dl52 | 3 | 982 |
| 74 | 723 | 6/22/14 | dl52 | 6 | 24 |
| 75 | 478 | 6/22/14 | yv51 | 11 | 385 |
| 76 | 389 | 6/25/14 | fm19 | 4 | 226 |

Figure 4: Prior Art - Column-Oriented Sales Table

| cid | date | price |
|---|---|---|
| fm19 | 6/17/14 | 110 |
| dl52 | 6/22/14 | 3,045 |
| dl52 | 6/22/14 | 982 |
| dl52 | 6/22/14 | 24 |
| yv51 | 6/22/14 | 385 |
| fm19 | 6/25/14 | 226 |

Figure 5: Prior Art - Data Required for Query

| cid | date | price |
|---|---|---|
| dl52 | 6/22/14 | 3,045 |
| dl52 | 6/22/14 | 982 |
| dl52 | 6/22/14 | 24 |
| fm19 | 6/17/14 | 110 |
| fm19 | 6/25/14 | 226 |
| yv51 | 6/22/14 | 385 |

Figure 6: Prior Art - Query Data Projection

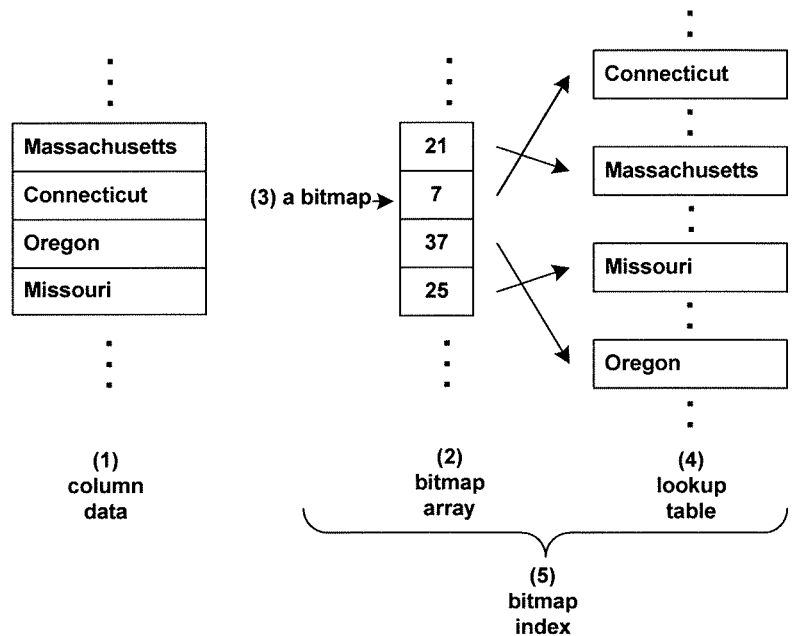
Figure 7: Prior Art - A Bitmap Index
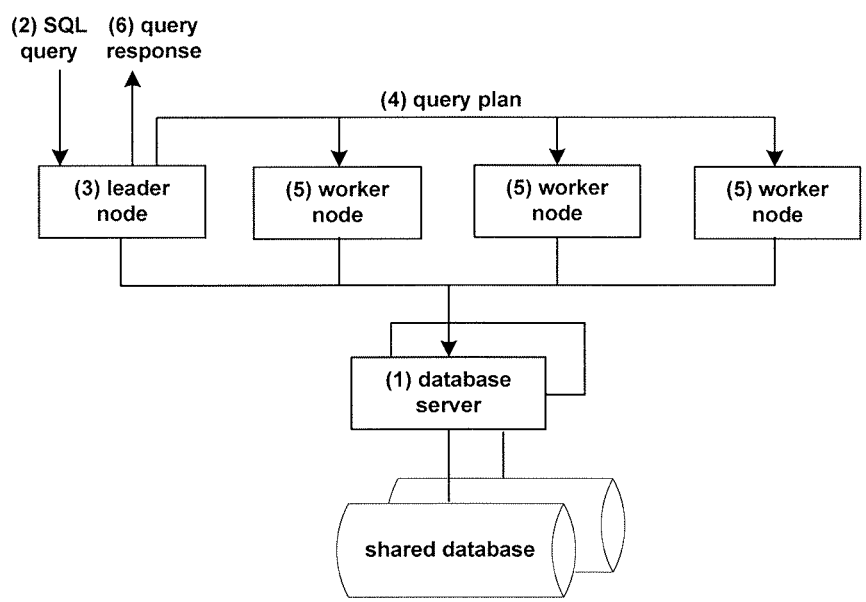
Figure 8: Prior Art - Sybase IQ PlexQ Grid Computing

| oid | date | cid | price | pid | quantity |
|---|---|---|---|---|---|
| 73 | 6/10/14 | fm19 | 110 | 437 | 1 |
| 74 | 6/22/14 | dl52 | 3,045 | 215 | 5 |
| 74 | 6/22/14 | dl52 | 982 | 556 | 3 |
| 74 | 6/22/14 | dl52 | 24 | 723 | 6 |
| 75 | 7/3/14 | yv51 | 385 | 478 | 11 |
| 76 | 7/8/14 | fm19 | 226 | 389 | 4 |
| 77 | 7/15/14 | dg33 | 448 | 654 | 2 |

Figure 9: Prior Art - A Sales Table

| oid | date | cid | price | pid | quantity |
|---|---|---|---|---|---|
| 73 | 6/10/14 | fm19 | 110 | 437 | 1 |
| 74 | 6/22/14 | dl52 | 3,045 | 215 | 5 |
| 74 | 6/22/14 | dl52 | 982 | 556 | 3 |
| 74 | 6/22/14 | dl52 | 24 | 723 | 6 |
| 75 | 7/3/14 | yv51 | 385 | 478 | 11 |
| 76 | 7/8/14 | fm19 | 226 | 389 | 4 |
| 77 | 7/15/14 | dg33 | 448 | 654 | 2 |

Figure 10: Prior Art - Predicates of Interest in the Sales Table

| June | |
|---|---|
| cid | price |
| fm19 | 110 |
| dl52 | 3,045 |
| dl52 | 982 |
| dl52 | 24 |

(1) container 1a

| June | |
|---|---|
| pid | quantity |
| 437 | 1 |
| 215 | 5 |
| 556 | 3 |
| 723 | 6 |

(2) container 1b

| July | |
|---|---|
| yv51 | 385 |
| fm19 | 226 |
| dg33 | 448 |

(3) container 2a

| July | |
|---|---|
| 478 | 11 |
| 389 | 4 |
| 654 | 2 |

(4) container 2b

Figure 11: Prior Art - Teradata Containers

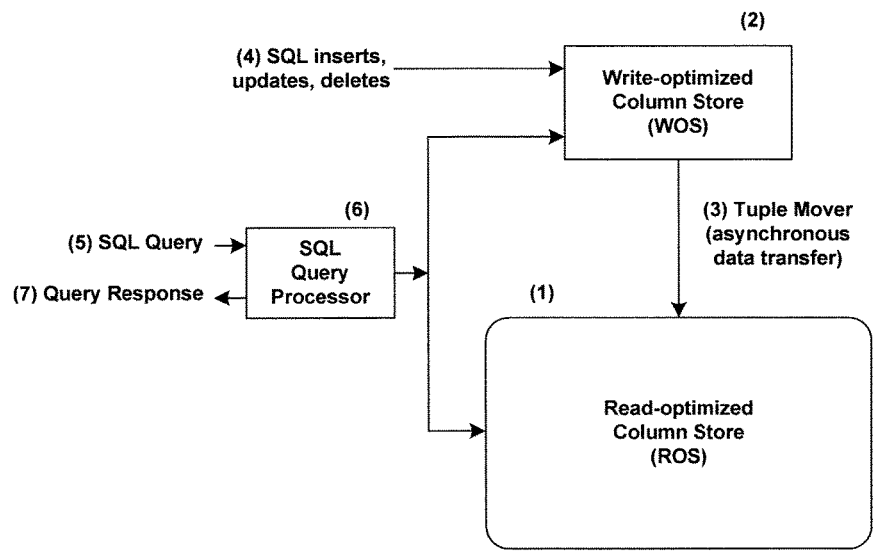
Figure 12: Prior Art - Vertica Architecture
| oid | pid | date | price |
|---|---|---|---|
| 73 | 437 | 6/17/14 | 110 |
| 74 | 215 | 6/22/14 | 3,045 |
| 74 | 556 | 6/22/14 | 982 |
| 74 | 723 | 6/22/14 | 24 |
| 75 | 478 | 6/22/14 | 385 |
| 76 | 389 | 6/25/14 | 226 |
projection oid, pid, date, price
| oid | pid | cid |
|---|---|---|
| 73 | 437 | fm19 |
| 74 | 215 | dl52 |
| 74 | 556 | dl52 |
| 74 | 723 | dl52 |
| 75 | 478 | yv51 |
| 76 | 389 | fm19 |
projection oid, pid, cid
Figure 13: Prior Art - Projections on the Sales Table

| oid | pid | date | price |
|---|---|---|---|
| 73 | 437 | 6/17/14 | 110 |
| 74 | 215 | 6/22/14 | 3,045 |
| 74 | 556 | 6/22/14 | 982 |

| oid | pid | cid |
|---|---|---|
| 73 | 437 | fm19 |
| 74 | 215 | dl52 |
| 74 | 556 | dl52 | segment 1 on machine 1

| oid | pid | date | price |
|---|---|---|---|
| 74 | 723 | 6/22/14 | 24 |
| 75 | 478 | 6/22/14 | 385 |
| 76 | 389 | 6/25/14 | 226 |

| oid | pid | cid |
|---|---|---|
| 74 | 723 | dl52 |
| 75 | 478 | yv51 |
| 76 | 389 | fm19 | segment 2 on machine 2

Figure 14: Prior Art – Partitioning of Data into Segments on Several Servers

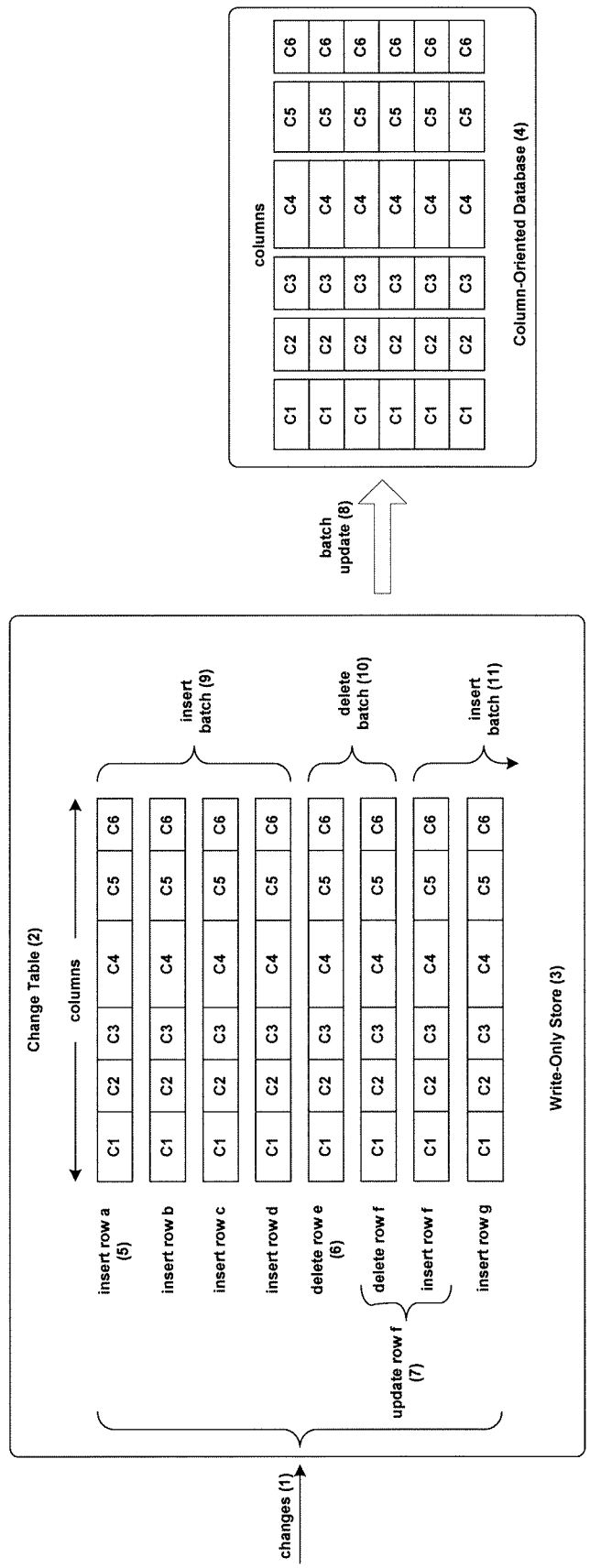
Figure 15: Prior Art - Updating a Column-Oriented Database

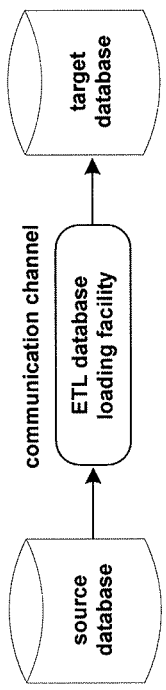
Figure 16: Loading a Target Database from a Source Database
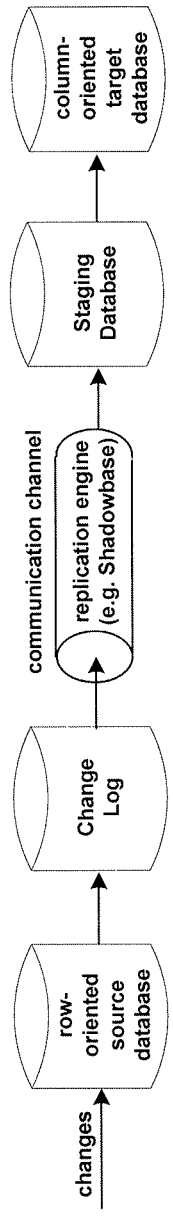
Figure 17: Synchronizing a Column-Oriented Database from a Row-Oriented Database
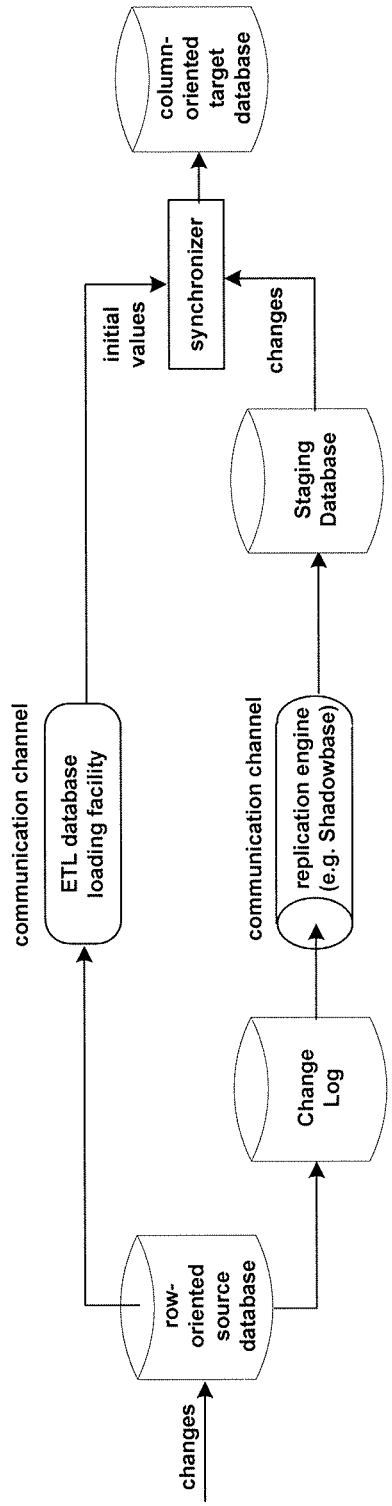
Figure 18: Online Loading of a Column-Oriented Database from a Row-Oriented Database

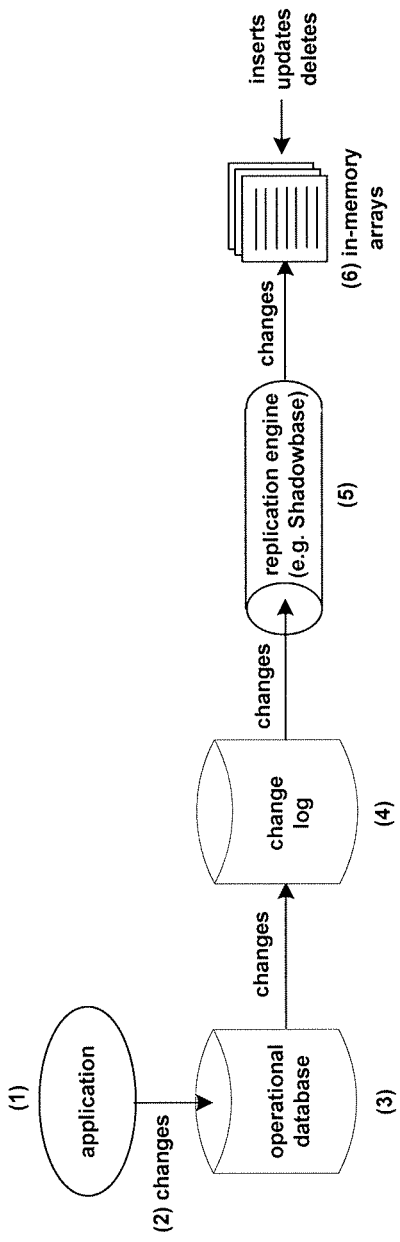
Figure 19: Creating a Staging Database as In-Memory Arrays
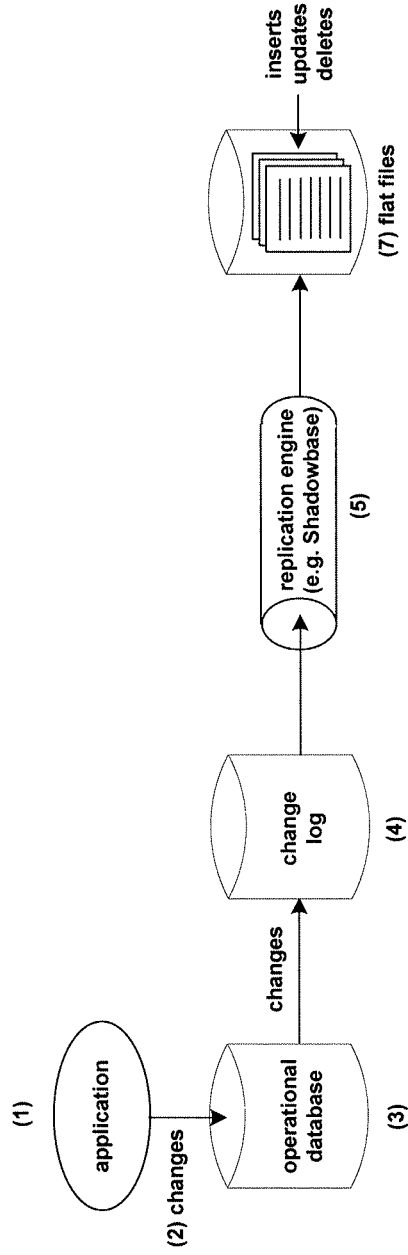
Figure 20: Creating a Staging Database as Flat Files

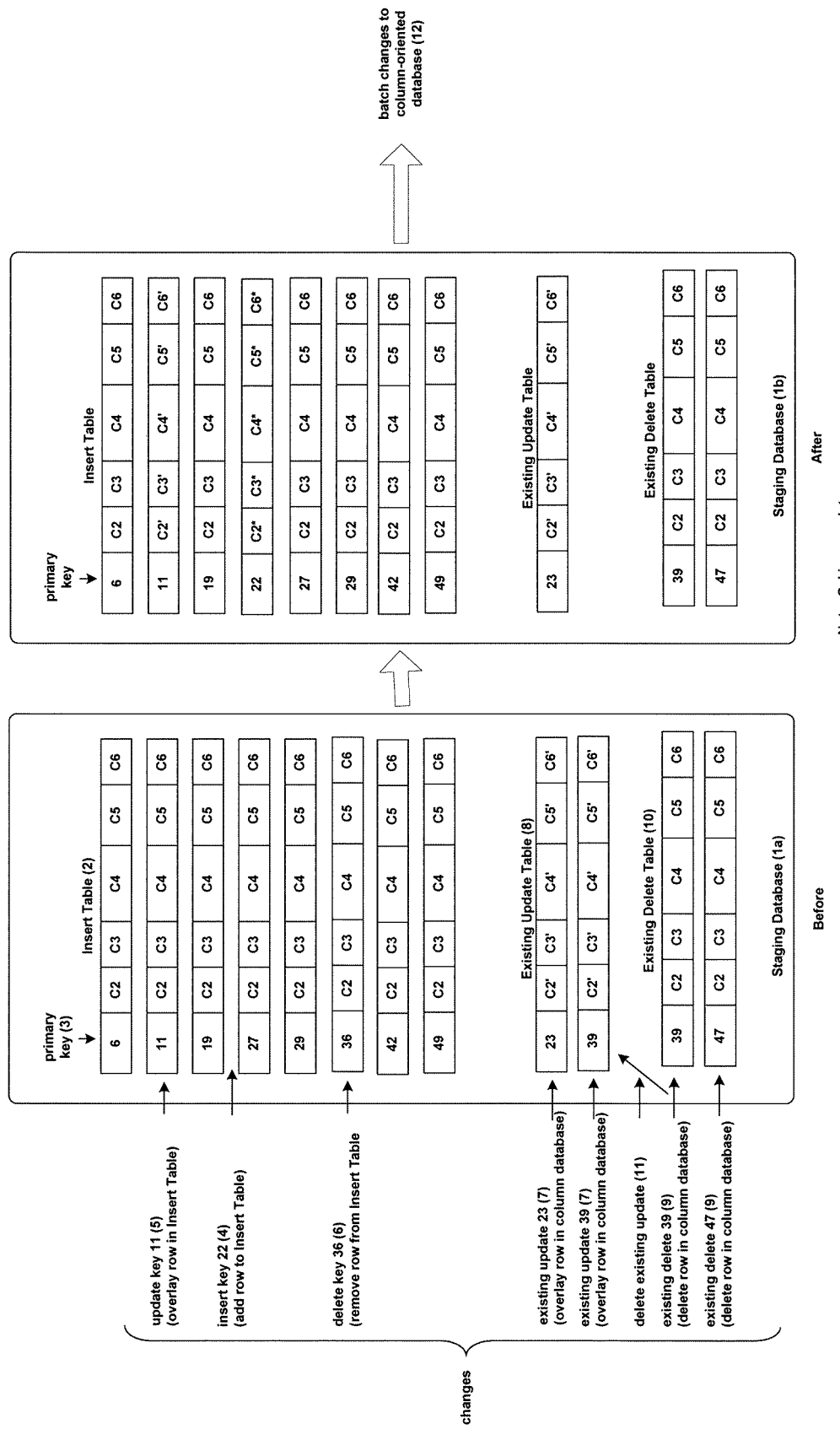
Figure 21: Updating a Row-Oriented Staging Database – Preserving Updates

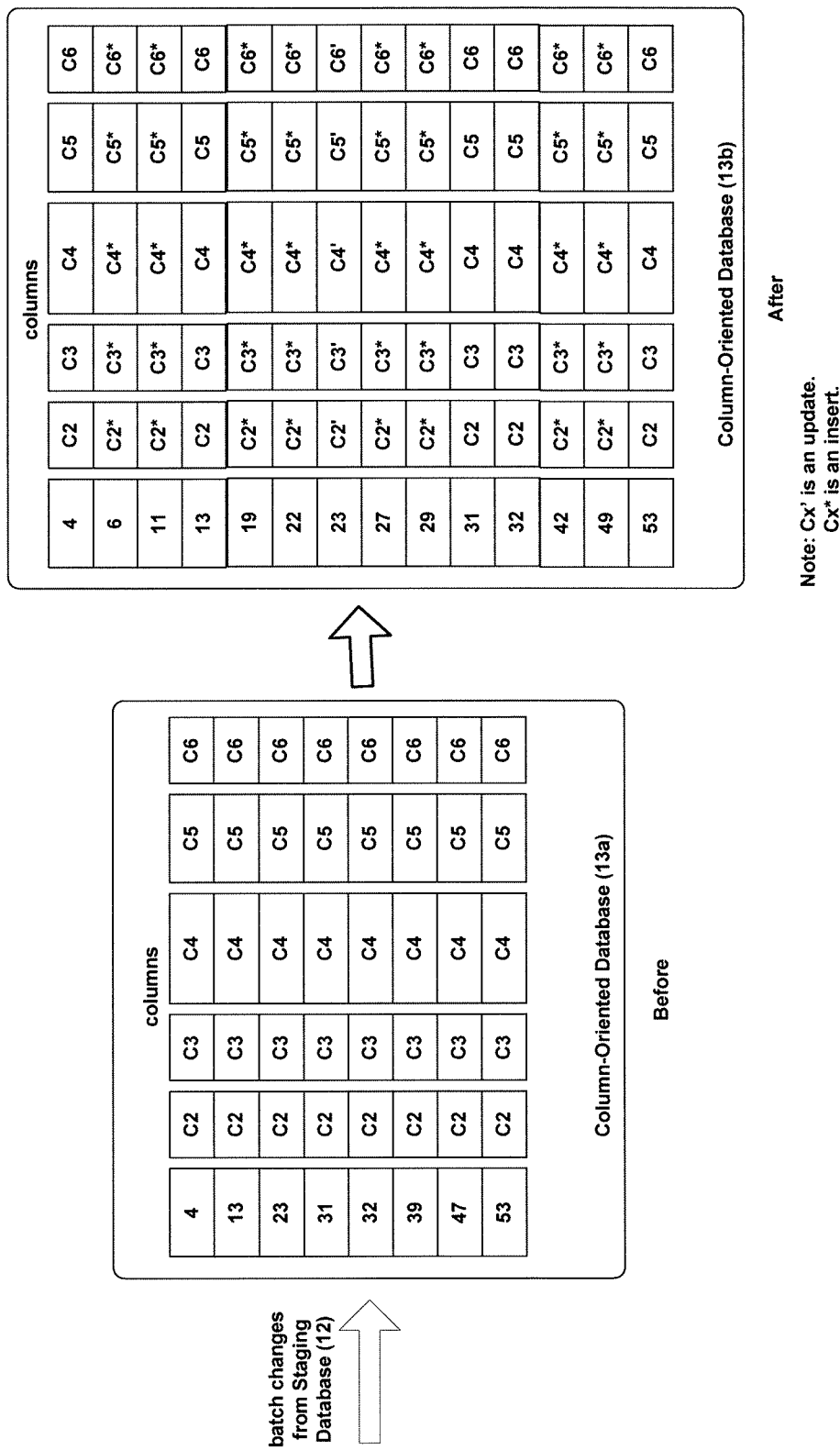
Figure 22: Updating a Column-Oriented Database with a Row-Oriented Staging Database - Preserving Updates

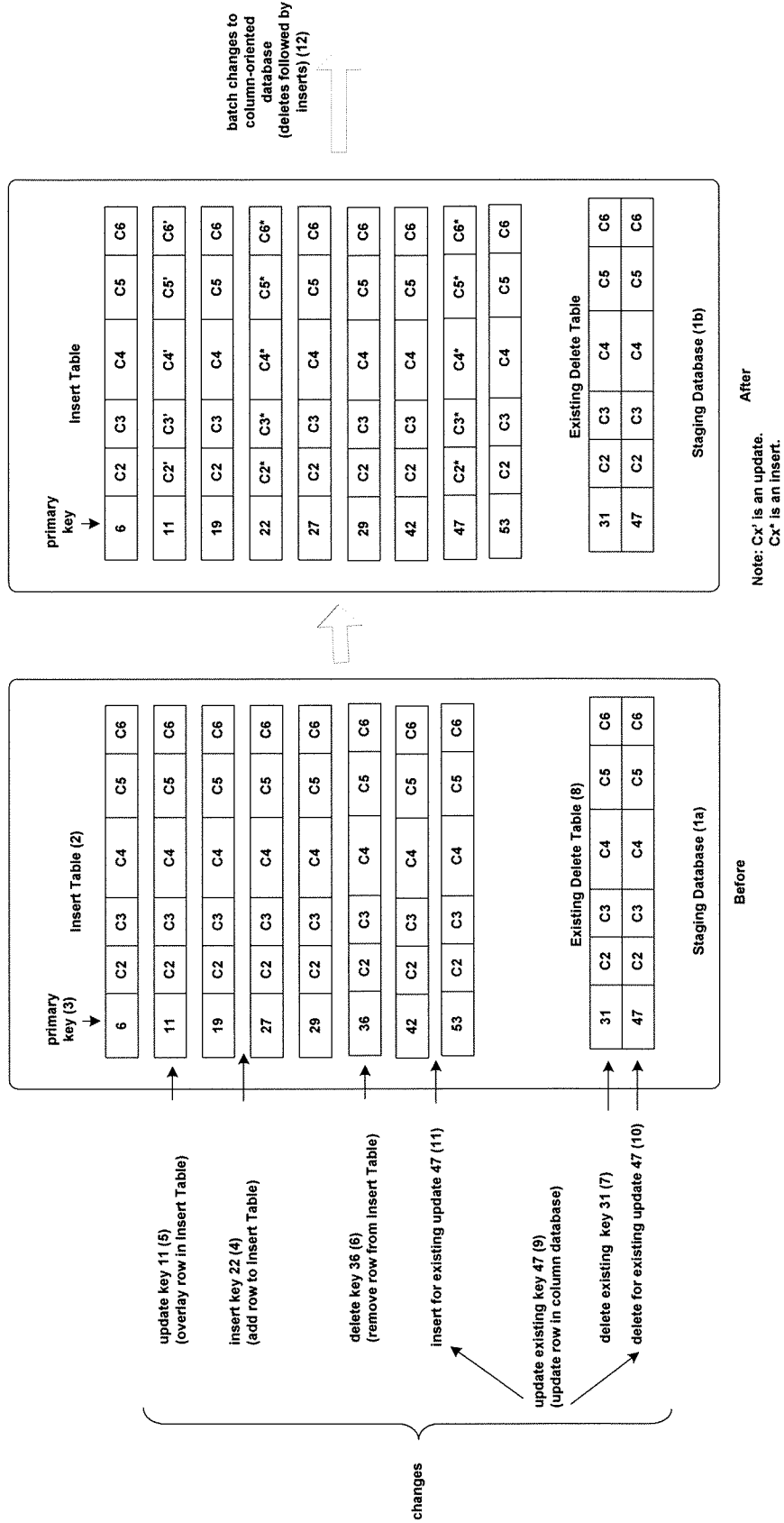
Figure 23: Updating a Row-Oriented Staging Database – Decomposing Updates

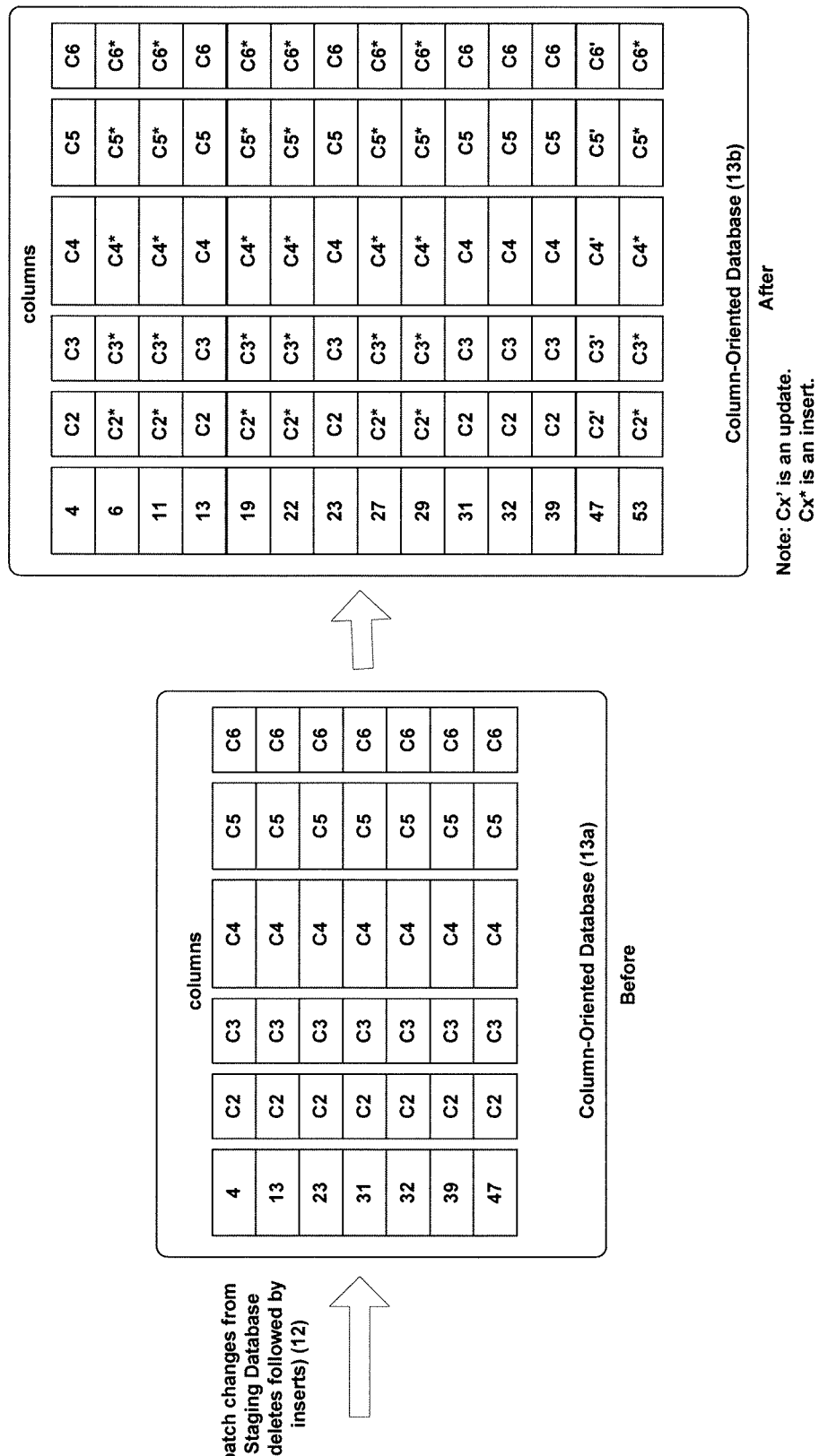
Figure 24: Updating a Column-Oriented Database with a Row-Oriented Staging Database - Decomposing Updates

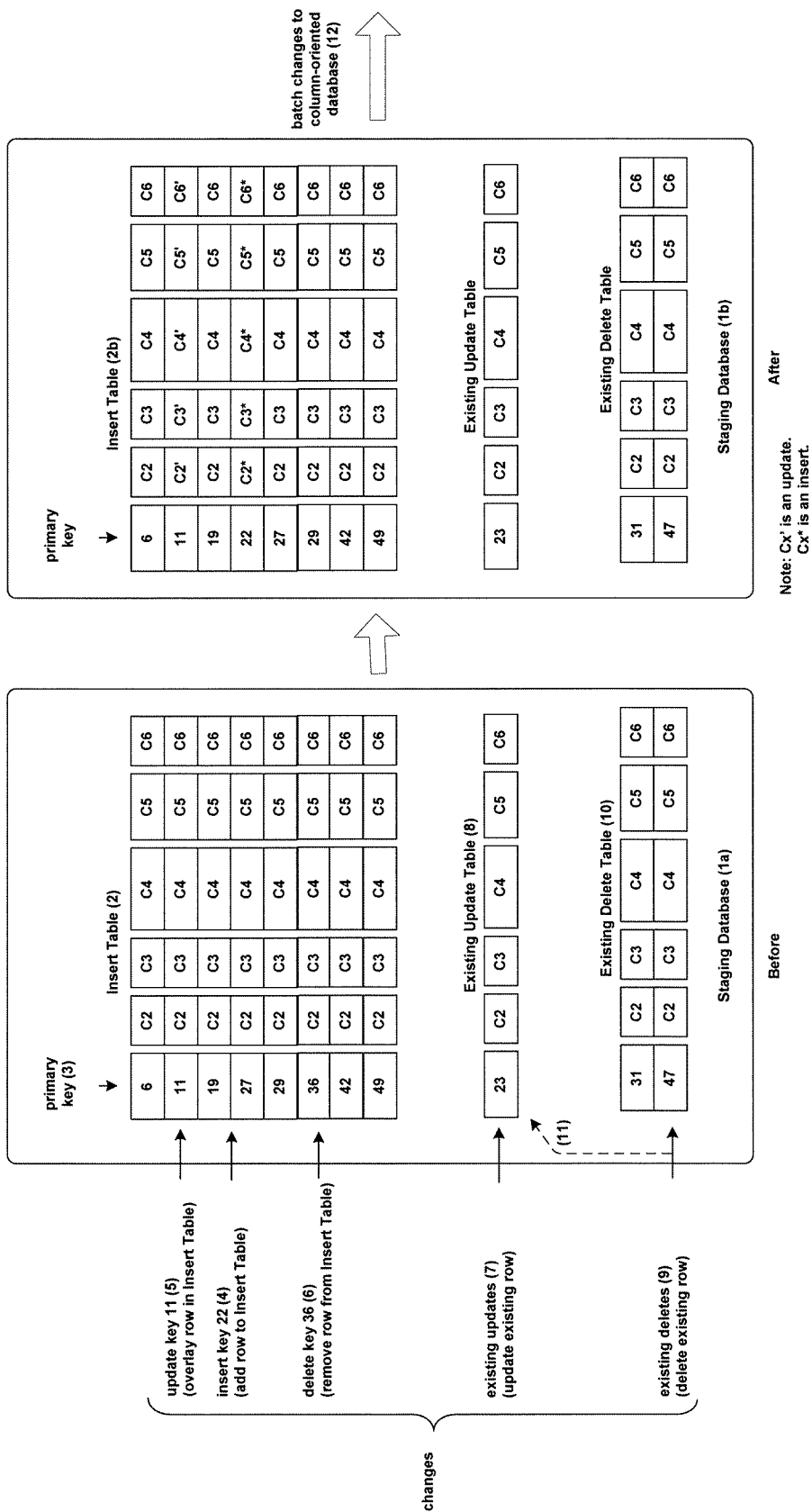
Figure 25: Updating a Column-Oriented Staging Database – Preserving Updates

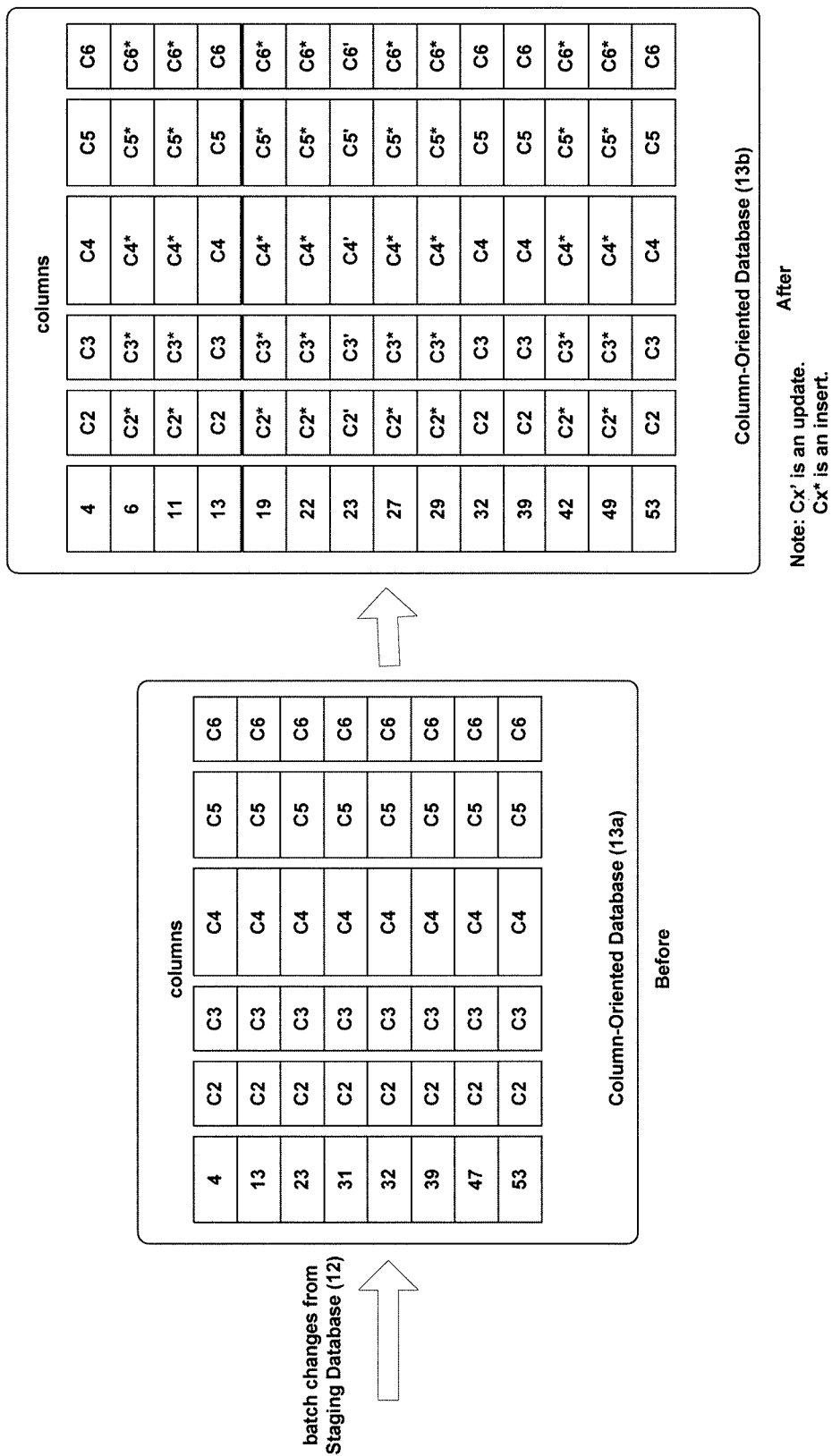
Figure 26: Updating a Column-Oriented Database with a Column-Oriented Staging Database - Preserving Updates

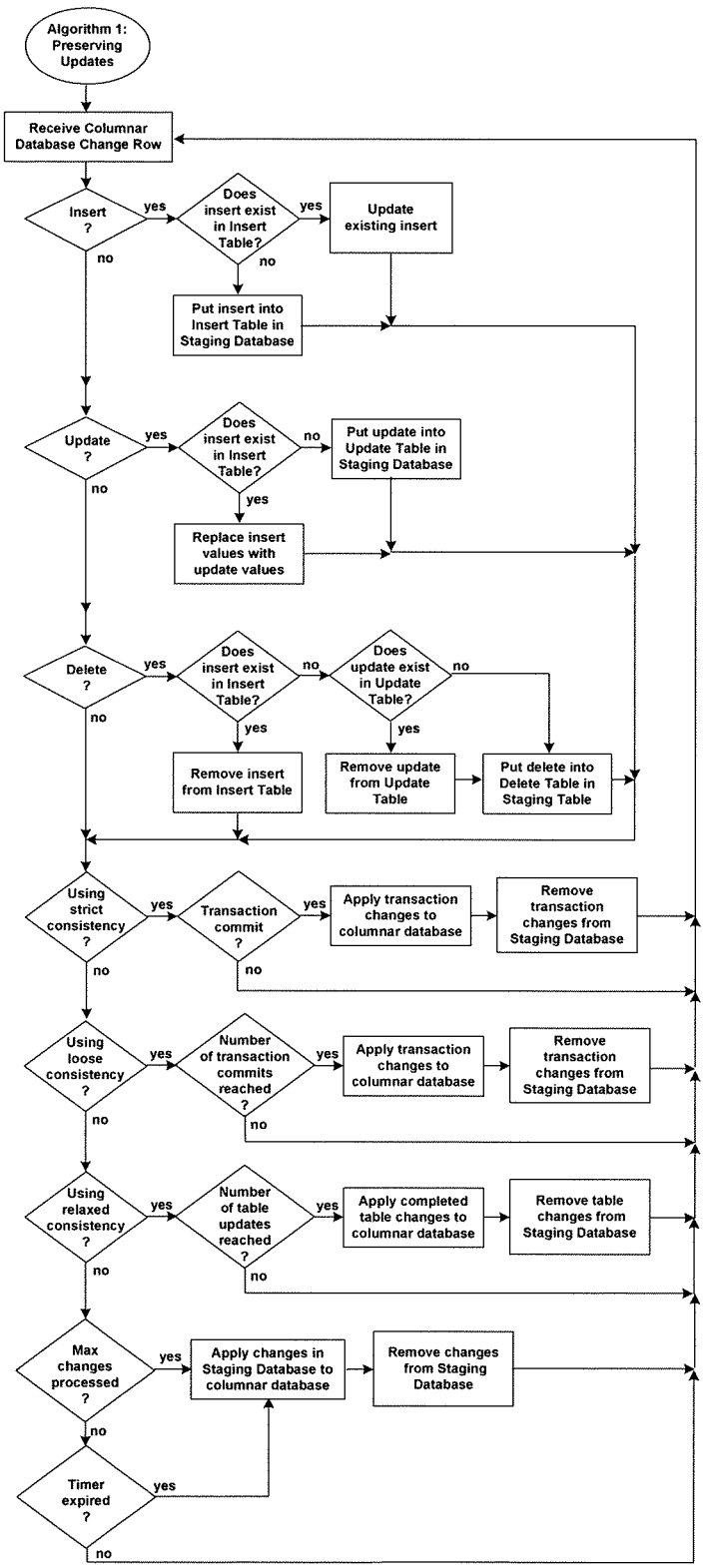
Figure 27: Flow Chart for Algorithm 1 - Preserving Updates

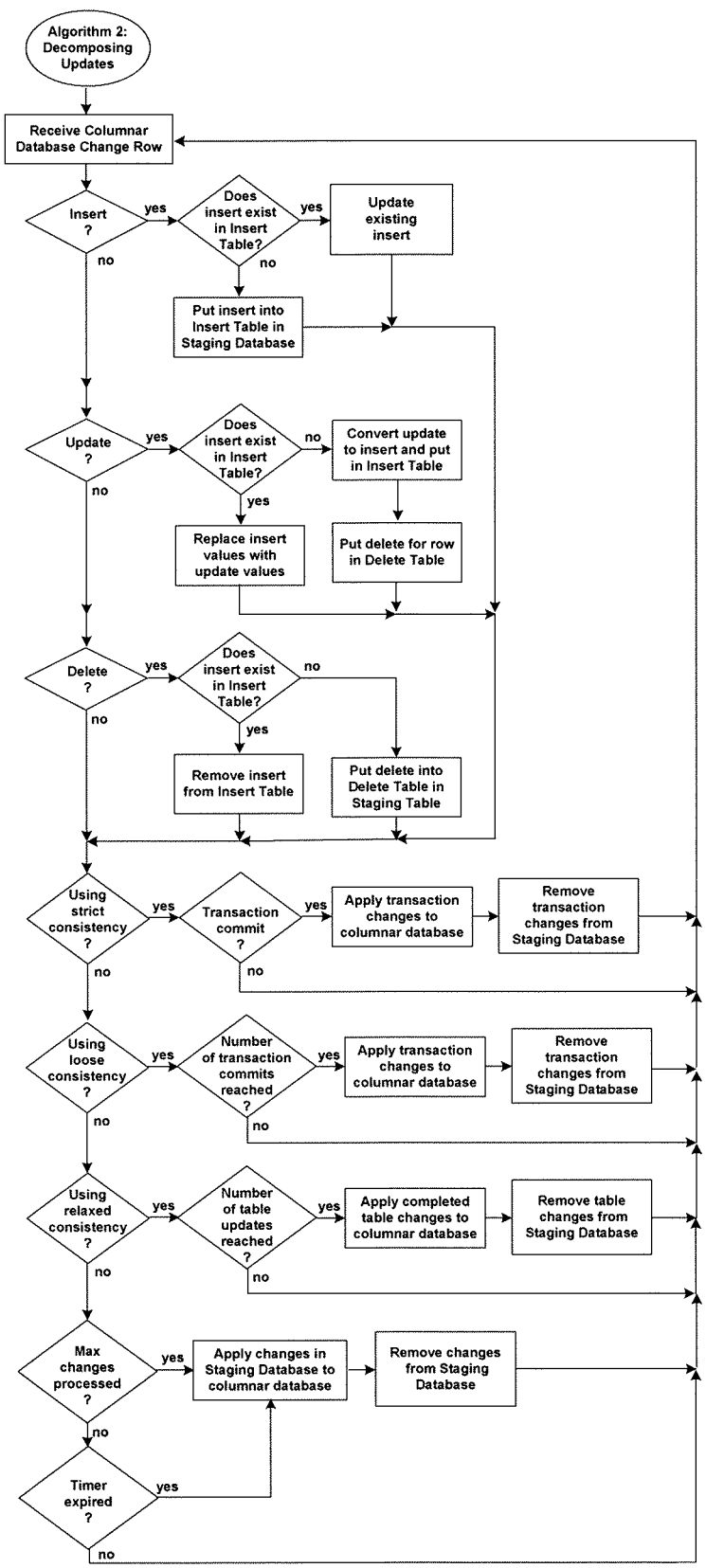
Figure 28: Flow Chart for Algorithm 2 - Decomposing Updates

METHOD AND COMPUTER PROGRAM PRODUCT FOR EFFICIENTLY LOADING AND SYNCHRONIZING COLUMN-ORIENTED DATABASES

BACKGROUND OF THE INVENTION

1 Background

1.1 Computer Applications

Much of our daily lives is augmented by computers. The many services upon which we depend, our banking, communications, air and rail travel, online shopping, credit-card and debit-card purchases, mail and package delivery, and electric-power distribution, are all managed by computer applications.

In its simplest form, as shown in FIG. 1, a typical computer application is generally implemented as a computer program (1) running in a computer (2). A computer program is basically a set of computer-encoded instructions, often called an executable because it can be executed by a computer. A computer program running in a computer is called a process, and each process has a unique identification known to the computer. Many copies of the same computer program can be running in a computer as separately distinguishable processes.

An application typically includes multiple interacting processes.

1.2 Application Database

With reference to FIG. 1, an application often depends upon a database (3) of information that the application maintains to record its current state. Often, the information in the database is fundamental to the operation of the application, to the decisions it makes, and to its delivery of services to the end users.

The database may be stored in persistent storage such as a disk for durability, it may be stored in high-speed memory for performance, or it may use a combination of these storage techniques. The database may be resident in the same computer as the application program, it may be resident in another computer, it may be implemented as an independent system, or it may be distributed among many systems.

A database generally includes one or more tables or files, though it may be just a random collection of unorganized data. Each table or file typically represents an entity set such as "employees" or "credit cards."

One category of databases is the row-oriented database. A row-oriented database comprises row-oriented tables or files. A row-oriented table consists of rows, each describing an entity-set member such as an employee. In a row-oriented database, each row of a table is typically stored in contiguous storage for efficient retrieval.

A row-oriented file is made up of records that describe members of an entity set. A row consists of columns that describe entity-set attributes such as salary. A record comprises fields that describe attributes of the entity set. In this specification, "files" are equivalent to "tables;" "records" are equivalent to "rows;" and "fields" are equivalent to "columns."

Another category of databases is the column-oriented database. In a column-oriented database, each column of a table is typically stored in contiguous storage for efficient retrieval. This structure provides an optimization for large queries. Rather than having to read all the columns of a large set of rows to respond to a query that requires only the data in a few columns, only those columns needed by the query must be read. In many column-oriented databases, only those columns of interest are kept in the database. The format of the column-oriented database need not match the full column set of the row-oriented database.

1.3 Requests

With further reference to FIG. 1, incoming end users (4) generate requests (5) to be processed by the computer application. End users may be people, other computer applications, other computer systems, or electronic devices such as electric power meters. In this specification, the term "end user" means any entity that can influence an application and/or can request or use the services that it provides.

An example of an incoming request from an end user is a request for a bank-account balance. Another example is an alert that a circuit breaker in a power substation has just tripped. In some cases, there may be no incoming requests. For instance, a computer application may on its own generate random events for testing other applications.

1.4 Request Processing

As shown in FIG. 1, as part of the request's processing, the application may make certain modifications to its database (6). It may insert rows into the database, update rows in the database, or delete rows in the database.

The application can read the contents of rows or columns in its database (7). As part of its processing, it may read certain information from its database to make decisions. Based on the request it received from its incoming end user and the data in its database, the application delivers certain services (8) to its outgoing end users (9).

1.5 Services

A service may be delivered by an application process as the result of a specific input from an end user, such as providing an account balance in response to an online banking query. Another example of a service is the generation of a report upon a request from an end user.

Alternatively, a service may be delivered spontaneously by the application program, such as on a timed basis or when certain conditions occur. For instance, a set of reports might be generated at the end of the business day. An alarm may be generated to operations staff if the load being carried by an electric-power transmission line exceeds a specified threshold.

The end users providing the input to the application may or may not be the same end users as those that receive its services.

1.6 Transactions

In many applications, changes to the database (for instance, inserts, updates, deletes, or changes to the database structure) are organized as transactions. A transaction is a delimited set of changes that either must all be made to a database or sent to an application, or else none are. For instance, a transaction in a banking application may transfer funds from one account to another. It applies a debit to one account (a reduction in its value) and an equal credit to another account (an increase in its value). Either both of these updates must occur or neither must occur in order to keep the customer's accounts balanced.

Audited transactions typically exhibit the ACID properties of Atomicity, Consistency, Isolation, and Durability. The ACID properties are defined in the "Definitions" section below.

The changes comprising a transaction are delimited by a pair of directives typically issued by the application process to a Transaction Manager. The beginning of a transaction is identified by a Begin Transaction directive (in some systems, the Begin Transaction directive is implied by the first change of a new transaction). The conclusion of a transaction is typically either a Commit Transaction directive or an Abort Transaction directive. A Commit Transaction directive causes all of the changes within the transaction to be applied to the database and to be durable. An Abort Transaction directive causes the changes within the transaction to be discarded. Though the terms Begin Transaction, Commit Transaction, and Abort Transaction are used in this specification, they are often known by different terms in different systems. However, the actions they perform are substantially the same in all systems.

A typical transaction appears as follows:
Begin Transaction
Insert Row A
Read Row B
Update Row B
Delete Row C
Commit Transaction The property of atomicity is guaranteed by ensuring that either all changes within the transaction are applied or that none are.

The property of consistency typically is guaranteed by locking all data objects that are to be changed so that their values are hidden from other applications until they have been committed or aborted as an entire transaction.

The property of isolation also typically is guaranteed by locking all data objects that are to be changed so that no other transaction can modify their values until the current transaction commits.

The property of durability typically is guaranteed by writing the changes to a persistent database such as disk so that they survive any ensuing system failures.

1.7 Database Schema

Most databases today are collections of tables that are organized as rows and columns. A typical table is shown in FIG. 2. A row (1) represents an entity such as a person. Each row contains attributes, such as salary or age. The attributes are the columns (2) of the table.

In a row-oriented database, entire rows typically are read from disk for processing. This is very efficient for answering simple queries such as "What is M. Franks' salary?" However, for complex queries, thousands of rows may have to be read to obtain the attributes from only a handful of columns. It requires reading all of the attributes of all of the rows. Since there can be tens or hundreds of attributes in a table, this is very inefficient.

Many applications today are query-intensive. Examples are data warehouses that store a massive amount of historical data. The data warehouse's database must support a high rate of complex queries. A column-oriented database addresses this challenge. Rather than reading rows, columns are read from disk. Therefore, only those columns necessary to satisfy a query must be read.

1.7.1 Row-Oriented Databases

As explained above, a row in a table describes an entity. For instance, the table may be a Sales Table containing a collection of sales entities. A particular row in the table describes a particular sale, which is an entity of the Sales Table. The row comprises columns that define the attributes of the entity. For a sales entity, the columns may include such attributes as the order ID (oid) and for each product ordered the product ID (pid), the date of the order, the customer ID (cid), the quantity, and the price. Additional tables may include a Customer Table that provides the details for each customer ID (name, address, etc.) and a Product Table that provides the details for each product ID (name, quantity in stock, etc.).

A typical row-oriented Sales Table is shown in FIG. 3. Each sale is indicated as a separate row in the Sales Table. This is a row-oriented database. Each row typically is stored in contiguous storage. Locality of data is maintained across horizontal rows of tables. Thus, an entire row can be read from disk with a single I/O operation.

Each row has one or more unique attributes (columns) that identify the row. This typically is known as the primary key for the row. The table typically is organized in primary key order.

If a primary key is not provided for the rows in the table, some other method is used to uniquely identify them. For example, a relative row number can be added to the rows as a unique identifier. When relative row numbers are used, each new row that is inserted into the table is appended to the end of the table with the next relative row number added as an extra column. Alternatively, the relative row number can be implicit with the position of the row in the table.

Alternatively, some other combination of column values or attributes, such as an internal database-assigned row ID or column ID, is used to uniquely identify the row or column.

In FIG. 3, each order can comprise one or more products. The primary key for the Sales Table is the concatenation of Order ID and Product ID (oid/pid). The table is maintained in oid/pid order as new rows are added or as rows are updated.

Any row can be referenced by specifying its oid/pid. It is straightforward to add sales to the Sales Table by simply appending them to the end of the table in oid/pid order, assuming Order IDs are assigned sequentially. A row may be updated by using its oid/pid to access the row, make the required modifications, and rewrite the row. A row may be deleted by specifying its oid/pid.

The table may be used to satisfy queries, typically employing the SQL structured query language. To support queries based on different columns, indices may be created. For instance, the developers may know that many queries will be based on Customer ID (cid). A typical query might be to ask how much each customer has ordered during a particular time period. To support this query, a customer index will be created and will list the primary keys of all of the rows in cid order. It is then only necessary to access the index to find all entries for any particular customer in the Sales Table and to read those entries to accumulate the customer's sales. Indices are generally organized as B-trees for fast random access, although other data structures are common as well.

To provide the flexibility of a column-oriented database, each column or subset of columns in the row-oriented database will have to have its own B-tree index. This makes inserting data into the database extremely expensive because not only must the new row be entered, but the B-tree for every column with an associated index also must be updated. However, the query access to a pertinent row is fast. The query must make two reads, one to get the primary key value from the index and one to read the desired row. Nevertheless, having to execute two reads and then read unneeded columns in the desired row make this process less efficient than a column-oriented database organization.

1.7.2 Column-Oriented Databases

Column-oriented databases can be much more efficient for processing complex queries than row-oriented databases, as described in this section.

1.7.2.1 Structure of a Column-Oriented Database

A problem with row-oriented databases is that an entire row usually must be read even if only certain columns are of interest to the query. For instance, in the example of FIG. 3, consider a query to determine how much each customer has ordered in a given time period. The only columns of interest are the Customer ID, the date, and the price. As an example, Customer ID dl52 ordered $4,051 worth of products on Jun. 22, 2014. However, in order to access this information, the Order ID, Product ID, and quantity columns must also be read from disk since typically only entire rows are accessible in a row-oriented database. Furthermore, two reads may be required to access a row if access is via an index.

In many databases, each row may have hundreds of attributes. Having to read the entire row to simply access the data in a small subset of columns is very inefficient.

This is a challenge that is satisfied with a column-oriented database, in which all of the data for a particular column is grouped together typically on a persistent storage medium such as disk. Locality of data is maintained across vertical columns of tables. An entire column of table data typically can be read efficiently from disk with a single I/O operation. Additionally, the column values often are sorted to provide fast access to just the column values of interest.

Therefore, it is only necessary to read the data in the columns of interest to satisfy a query. The row-oriented Sales Table of FIG. 3 is shown as a column-oriented Sales Table in FIG. 4. To satisfy the above query, only the cid, date, and price columns need to be read.

Since all of the data for a column is stored as a single aggregate, accessing only those columns needed to respond to a query is much faster than if that data has to be accessed from a row-oriented database, in which all column values must be read from storage. Furthermore, in many implementations, only the columns of interest are stored in the column-oriented database. Columns that will not be used in queries do not have to be stored. The data contained in a column-oriented database can be a subset of the data in the corresponding row-oriented database.

1.7.2.2 An Example of a Query Strategy

To date, there is no standard architecture for column-oriented databases. The architecture of each is somewhat different, and they each use different query strategies.

However, an example query strategy follows. It illustrates the use of the column-oriented database of FIG. 4 to satisfy a query requesting the amount of sales made to each customer during a given time period. The first step is to read in only the columns of interest—the Customer ID, the date, and the price—as shown in FIG. 5. This column-oriented data is then sorted by Customer ID and then by date within customer, as shown in FIG. 6. The sorted set of column-oriented data is known as a projection of the data in the database.

It is now a simple step to answer the query, "How much did each customer order during the period Jun. 20, 2014, through Jun. 24, 2014?" A simple perusal of the projection shows that customer dl52 ordered $4,051, customer fm19 ordered $110 (his order of $226 occurred after the query time interval), and customer yv51 ordered $385. The query was resolved without having to read any of the attributes that were not needed to satisfy the query.

1.8 Sybase IQ—a Prior-Art Example of a Column-Oriented Database

As indicated above, there is no standard architecture today for column-oriented databases. One example of a commercially available column-oriented database is Sybase IQ, provided by SAP AG, headquartered in Walldorf, Germany. This product also is known as SAP Sybase IQ and SAP IQ. It was commercially introduced in 1995.

In Sybase IQ, tables are stored as columns rather than as rows. However, the columns do not contain the column data. Rather, each column is represented by one or more bitmap indices described in Section 1.8.1.1, "Bitmaps" (with one exception, described in that section). The column data is derived from the bitmap indices.

Representing columns by indices on the column data has several advantages. Bitmap indices are readily compressible and significantly reduce the amount of storage required for the table. Benchmarks have shown that a table with several bitmap indices on each column can be stored in about the same storage space as the original table, as compared with a requirement of three or four times the amount of storage needed by a row-oriented table with all of its B-tree indices.

Most Sybase IQ query operations can operate on the compressed data without the need for decompression, thereby speeding queries. Because each column can be referenced by several bitmap indices without significantly increasing storage requirements, queries can be much more efficient.

1.8.1 Database Columns

Sybase IQ replaces the data in columns with bitmaps, which provide more efficient storage.

1.8.1.1 Bitmaps

A bitmap index comprises two pieces. One piece is a logical array (the bitmap array) of n fixed-length entries, where n is the number of rows in the table. Thus, there is one element in the array corresponding to each row in the table. The other piece is a lookup table where each distinct value in the column appears exactly once. Each element of the bitmap array is a key (the bitmap) pointing to the location in the lookup table where the cell value is stored.

An example of a bitmap index is shown in FIG. 7. The index is on a table column (1) that holds the names of the fifty U.S. states. Each element in the bitmap array (2) is a bitmap (3) that contains the location in the lookup table (4) of the name of the corresponding state in the data column. The combination of the bitmap array and the lookup table is the bitmap index (5).

To get an appreciation for the efficiency of a bitmap index, consider a table with 10,000 rows. Assume that fifteen bytes are allocated for a state name. The state-name data column will take 150,000 bytes. However, the bitmap for fifty states can be contained in one byte (one byte can represent 256 unique values). Therefore, each entry in the bitmap array will require only one byte rather than fifteen bytes. The bitmap array therefore will require 10,000 bytes of storage. The lookup table will require another 50×15=750 bytes of storage. Therefore, the bitmap index will require only 10,750 bytes of storage rather than 150,000 bytes.

Furthermore, the bitmap array is highly compressible since it is a large array containing few unique values. Run-length encoding, in which a string of like values is replaced with the value and the length of the string, can reduce significantly the size of the bitmap array:

47 47 47 47 47 201 201 201→47 (5) 201 (3)

Sybase IQ uses SQL statements to manipulate its database Most of the Sybase IQ SQL operations can operate on compressed data without the need for decompression.

1.8.1.2 Default Indices

Each column in a Sybase IQ table is encoded automatically as a bitmap. The bitmap indices are called Fast Projection Default Indices. Four levels of such bitmap indices are used by Sybase IQ:

i. An FP(1) index is used if a column has no more than 256 unique values ($2^8$). For an FP(1) index, the bitmap is one byte.

ii. An FP(2) index is used if a column has no more than 65,536 unique values ($2^{16}$). For an FP(2) index, the bitmap is two bytes.

iii. An FP(3) index is used if a column has no more than 16,777,216 unique values ($2^{24}$). For an FP(3) index, the bitmap is three bytes.

iv. A Flat FP index is used for a column that has more than 16,777,216 values. In this case, a bitmap index is not used. The column data itself is used for the column in Sybase IQ.

1.8.2 Other Indices

In addition to the default indices, the database administrator can add one or more additional indices to a column to speed query processing. Additional indices can be added or dropped at any time. Sybase IQ always uses the fastest index available for the current query. If the index types that the query optimizer ideally would like to use for a column have not been created, Sybase IQ still can resolve queries involving the column; but the response may be slower than it would be with the correct index type(s)

Additional Sybase IQ column index types include:

| Index Type | Purpose |
| --- | --- |
| High_Group (HG) | An enhanced B-tree index to process equality and group-by operations on high-cardinality data. |
| High_Non-Group (HNG) | A non-value-based bitmap index ideal for most high-cardinality operations involving ranges or aggregates. |
| Low_Fast (LF) | A value-based bitmap for processing queries on low-cardinality data. |
| DATE | An index on columns of data type DATE. Used to process queries involving date quantities |
| TIME | An index on columns of data type TIME. Used to process queries involving time quantities. |
| DATETIME (DTTM) | An index on columns of data type DATETIME or TIMESTAMP. Used to process queries involving date/time quantities |
| WD | Used to index keywords by treating the contents of a CHAR, VARCHAR, or LONG VARCHAR column as a delimited list. |

Sybase IQ also can create join indices on groups of columns that represent an outer join of two or more tables.

1.8.3 Insertions

Most insertions into and deletions from a Sybase IQ database are made for an entire table, not for a single row. Therefore, table inserts generally are performed on a batch basis rather than interactively. Applications for Sybase IQ tend to revolve around data-warehouse-like systems where bulk loading is appropriate. The result is that queries are based on stale data. Any data that has arrived since the last update is not included in the query results.

Sybase IQ does support interactive inserts, updates, and deletes. However, these are inefficient, as each interactive operation imposes a significant amount of processing overhead. Consequently, interactive changes typically are not made to the Sybase IQ database to keep the data current for real-time queries.

Typical SQL statements used for table loading and updating include:

i. For efficient bulk loading of tables from flat files—LOAD TABLE.

ii. To insert rows selected from a table—INSERT with SELECT statement clause. iii. To insert rows in a table residing in another database—INSERT with LOCATION statement clause.

iv. To insert specified values into a table row by row—INSERT with VALUES option (for small quantities of data).

v. To remove specific rows from a table—DELETE.

vi. To change existing rows in a table—UPDATE.

Sybase IQ allows multiple concurrent readers but only one writer to a table or a table partition at any one time.

1.8.4 Grid Computing

Sybase IQ PlexQ is a highly scalable, shared-grid compute architecture that allows concurrent data loads and queries via independent data-processing nodes connected to a shared data source. PlexQ can scale to large numbers of nodes to support tens of thousands of users with little or no data load or query performance degradation as nodes are added to the multiplex.

As shown in FIG. 8, PlexQ is a large array of shared-everything processors. PlexQ supports Linux, Unix, and Windows processors. For language interfaces, it supports ODBC, JDBC, and embedded SQL.

An array of low-cost commodity processors have access to a common storage (1) that stores all of the Sybase IQ tables and indices. A SQL query (or load command) (2) is received by one of the servers in the multiplex. This server is the leader node (3). The leader node prepares a query plan (4) and sends it to the other servers in the grid, the worker nodes (5), for execution. Each server, including the leader node, executes its own portion of the query and returns the results to the leader node. The leader node collates the results and returns the query response to the requestor (6).

The servers in the PlexQ can be separated into logical servers supporting different communities of users. Each logical server includes a leader node and a set of worker nodes. When a query is submitted, the work units are distributed only to worker nodes that are members of the logical server of the current leader node.

In general, the more nodes there are in a logical server, the better the query performance. Distributed query processing uses the available memory and CPU resources of all nodes in the logical server.

1.8.5 Consistency

Sybase IQ generally batches updates and applies them periodically. Therefore, Sybase IQ provides loose-loading consistency and loose-query consistency. The Sybase IQ database exhibits eventual consistency at the point that it is updated.

1.9 Teradata Columnar—A Prior-Art Example of a Column-Oriented Database

Another example of a column-oriented database is one offered by Teradata Corporation, headquartered in Miamisburg, Ohio, U.S.A. Teradata has produced products for data warehousing for decades. Founded in 1979, it provides the Teradata relational database management system, focused on supporting data warehouses.

The original Teradata database was a row-oriented database. However, as time went on, databases grew increasingly larger both in terms of the number of rows in the database and the number of columns in the rows. Queries that required only a few columns still had to fetch from a Teradata database the entire contents of all rows needed to satisfy the query.

Therefore, in 2011, Teradata introduced Teradata Columnar, a column-oriented database capability that augmented its classic row-oriented database. Teradata Columnar is a hybrid row and column database. It allows users to mix-and-match column-oriented and row-oriented physical storage to best meet the needs of the application.

1.9.1 Mixing Column-Oriented and Row-Oriented Structures

To illustrate the use of the hybrid architecture of Teradata, consider the Sales Table shown in FIG. 9. It comprises six columns—the Order ID (oid), the date of purchase (date), the Customer ID (cid), the value of the purchase (price), the Product ID (pid), and the quantity of the product purchased (quantity).

Let us assume that two frequently used queries are the following:
  i. Query 1: How much did each customer spend in a month?
  ii. Query 2: What is the quantity of each product that was sold in a month?

Query 1 requires the customer ID and the price. Summing the price over all purchases made by each customer for a given month satisfies Query 1. Query 2 requires the product ID and the quantity. Summing the quantity sold for each product for a given month satisfies Query 2. These quantities—cid, price, pid, and quantity—should be stored as columns instead of rows to enable efficient access to stored data.

Query 1 and Query 2 both ask for data for monthly timeframes. Therefore, each required column set ideally will be partitioned by month. This organization is shown in FIG. 10. The columns cid and price are grouped for the month of June and for the month of July. The columns pid and quantity likewise are grouped for the months of June and July. The result is not a vertical organization, as it would be for a column-oriented database. Nor is the result a horizontal organization, as it would be for a row-oriented database. Rather, the data is organized in a rectangular schema that is both row-oriented and column-oriented. This is the hybrid Teradata Columnar database.

1.9.2 Teradata Containers

Teradata stores each grouping of related data in a container, as shown in FIG. 11. Container 1*a* (1) contains the cid and price data for June. Container 1*b* (2) contains the pid and quantity data for June. Container 2*a* (3) contains the cid and price data for July. Container 2*b* (4) contains the pid and quantity data for July. The month with which each container is associated is contained in a container header.

This table organization is much more flexible than a pure column store that enforces each column to be stored separately. If appropriate for a particular query, a container may include only columns or only rows. It is the designer's task to decide which design to use.

Columns are readily compressible. Teradata will compress each column in each container with the most effective compression algorithm it has or knows of unless it is directed not to do so.

Teradata Columnar is integrated into the Teradata database in such a way that it works with all of the Teradata features. For instance, the data in the most heavily used containers are moved to the fastest (and most expensive) available storage, while less frequently used containers are moved to slower and less expensive storage.

1.9.3 Updates and Deletes

Updates and deletes are accomplished rather inefficiently by Teradata. Deleted records are marked as deleted but are not removed from disk storage. For updates, the original record is marked as deleted; and the new record is inserted into the database.

1.9.4 Query Processing

To respond to a query, Teradata determines the best containers to use to obtain the data required by the query. It retrieves the columns it needs from these containers, decompresses them, and constructs a row-oriented table containing the data. The table includes only the columns needed, organized into the rows needed. Teradata then uses its traditional row-based database engine to satisfy the query.

Teradata ensures customers that the most efficient query plan will be built based on the containers available to it, whether the containers selected are row-oriented, column-oriented, or a mixture of both.

1.9.5 Consistency

Since the Teradata database is essentially row-oriented in that each container contains portions of rows, Teradata updates its containers in real time. When an insert arrives, it is inserted into the appropriate containers. An update causes the corresponding row in the containers to be marked as deleted and subsequently not used in query results, and the new contents of the row are inserted into the appropriate containers and subsequently used in query results.

Thus, the Teradata column-oriented database provides strict loading consistency and strict query consistency.

1.10 Vertica Analytic Database—A Prior-Art Example of a Column-Oriented Database Yet another example of a commercially available column-oriented database is that from Vertica Systems, Cambridge, Mass., U.S.A. Vertica is a Hewlett-Packard Enterprise company.

The Vertica Analytic Database is a SQL database designed to manage large, fast-growing volumes of data and to provide very fast query performance when used for data warehouses and other query-intensive applications. It manages petabyte-scale databases on a grid of commodity Linux servers. In benchmarks, Vertica has been shown to answer queries 50 to 200 times faster than row-oriented databases. It also is able to insert new data at very high rates of speed while the database is being queried, thus enabling real-time analysis of current data.

The architecture of the Vertica Analytic Database is shown in FIG. 12. Vertica is internally organized as a hybrid store. It comprises two storage modules, the Read-optimized Column Store (ROS) (1) and the Write-optimized Column Store (WOS) (2). The ROS is the primary data store for Vertica. It is in the ROS that the bulk of data used by queries is stored in column-oriented format. The WOS is a small, temporary store that contains database inserts that have yet to be made. Inserts are moved periodically from the WOS to the ROS via the Tuple Mover (3), Vertica's database optimizer, which is described in Section 1.10.3, "Tuple Mover."

1.10.1 Read-Optimized Column Store (ROS)

The ROS is the primary data storage. It not only stores the entire database as columns, but it also stores a variety of projections of that data.

1.10.1.1 Projections

As described earlier in Section 1.7.2.2, "An Example of a Query Strategy," a projection is a set of columns sorted on a certain attribute or group of attributes, which optimizes the projection for answering queries with predicates on its attributes Vertica stores tables as a set of projections. Consider the six-column Sales Table of FIG. 4 as a ROS. One projection might be [Order ID (oid), Product ID (pid), date, price] sorted on oid, then pid. Another projection might be [oid, pid, Customer ID (cid)] also sorted on oid/pid. These projections are shown in FIG. 13. Note that the two projections duplicate the columns in the ROS. They require the column data of seven columns, even though the ROS carries only six columns. Thus, thirteen columns are now stored in the ROS. Each logical column may be stored in several different projections.

1.10.1.2 Compression

The nature of column-oriented data is that the data is often very similar throughout the column. Therefore, it is easily compressible. For instance, a particular data item may be repeated sequentially many times. It is only necessary to store the data value once along with a count of the number of subsequent occurrences of that data item:

aaaaaaaaaabbbbbbcccccccccccc→a (10) b (6) c (12)

Likewise, ordered sequences of large numbers can be represented by increments from the previous value:

1,450,300 1,450,310 1,450,345 1,450,351→1,450,300 10 35 6

Depending upon the nature of the data, all of the data in the ROS is compressed using one of several compression algorithms. Vertica's query execution engine generally can operate on compressed data so that the overhead of decompression often is avoided.

Vertica finds that it can reduce the amount of storage required by compressed columns by up to 90% as compared to the uncompressed versions. Compression compensates for the multiple storage of columns for projections. However, compression adds to the CPU load when the data must be decompressed during a query execution.

Note that in a row-oriented database, values within a row are not likely to be similar and hence are unlikely to compress well.

1.10.1.3 Segmentation and Grid Computing

Vertica is designed to be run on a grid of low-cost commodity Linux servers. To do this, projections are segmented. FIG. 14 shows the projections of FIG. 13 broken into two segments. Each segment can run on a different server in the grid. The architecture is "shared-nothing" in that any one segment of any one projection is resident on only one server in the grid, and only that server can access that segment.

Segmentation allows a query to be spread across several servers—all of the servers in the grid servicing one or more segments of the projections required by the query. Therefore, the performance of query execution is significantly enhanced by parallel computing.

In addition, inserts into the database are distributed across the servers in the grid. Therefore, real-time loading of new data into the database is extremely fast due to parallel processing, assuming the inserts are randomly distributed.

Many applications are linearly scalable with the number of servers in the grid.

1.10.1.4 K-Safety

Vertica ensures k-safety. This means that k of the servers in the grid can fail, yet Vertica continues to execute all queries. It accomplishes this by ensuring each column of the database to be represented in the projections of data on at least k+1 servers in the grid. If one or more servers fail, their projections can be reconstructed upon their recovery from the data in projections stored on the other servers. The distribution of projections is such as to guarantee the proper recovery of servers even if k servers fail.

1.10.2 Write-Optimized Column Store (WOS)

The WOS is a temporary store that holds inserts to be made to the ROS. Inserts are merged with the ROS frequently enough to allow the WOS to remain in memory. The WOS also is replicated across the servers in the grid to ensure k-safety.

Rows to be inserted into the database are fed to the WOS via SQL INSERT statements and are stored in the WOS in the order in which they are received. The data is stored in the WOS in columns, but the data is neither sorted nor compressed. The data in the WOS is included in any queries along with the data in the ROS. Thus, insert operations occur concurrently with querying to enable real-time analytics.

If the WOS receives an update or a delete for a row that is in the WOS memory, it applies the change immediately. The WOS can accept deletes of rows in the ROS and stores the deletes for purging when the WOS data is merged with the ROS. Updates to ROS data are implemented as a delete followed by an insert.

1.10.3 Tuple Mover

The Tuple Mover periodically merges the WOS data with the ROS database. For each projection, the appropriate WOS columns are selected, sorted, compressed, and inserted in order into the projection. When the merge of a projection is completed, the old projection is replaced with the new projection.

The Tuple Mover also manages the delete directives. When the Tuple Mover comes to a data item that is to be deleted within a column, it removes that column's data item value. If the delete were part of an update, the new value of the data item is inserted as part of the merge process.

1.10.4 SQL Query Processor

Returning to FIG. 12, changes to the database (4) are fed via SQL statements to the WOS, which stores them temporarily. The changes are mostly inserts into the database but also can be deletes and updates (which are converted to a delete and an insert).

SQL queries (5) are received by the SQL Query Processor (6), which is distributed among all of the grid nodes, including the WOS. Each node creates a query plan using the best projections available to it. The SQL Query Processor then collates the responses and returns the query answer to the requesting application (7).

1.10.5 Database Designer

The determination of the optimum projections available is a daunting task. Vertica provides its Database Designer (DB Designer) to help database administrators construct an efficient database schema.

The DB Designer monitors the query activity and selects a good set of overlapping projections available to each table. In doing so, it ensures k-safety. The database administrator can use the recommendations of the DB Designer or can reject or modify certain aspects of the proposed schema.

The DB Designer is able to redesign the projections incrementally in order to iteratively optimize them for the current workload as the workload changes over time.

1.10.6 Consistency

Vertica batches inserts, deletes, and updates (as inserts followed by deletes) in the WOS and applies them periodically to the ROS. Therefore, the ROS is loosely consistent but exhibits eventual consistency at the point that it is updated. However, queries against the Vertica database include the data in both the WOS and the ROS. Therefore, Vertica queries are strictly consistent.

1.11 Updating a Column-Oriented Database

The updating of a column-oriented database primarily involves the insertion of new data for the purpose of historical recordkeeping, such as that needed for data warehouses. Occasionally, data in the database is updated or deleted. Column-oriented databases typically are optimized for inserts; they handle updates and deletes inefficiently. For example, measurements have shown that doing a single insert, update, or delete of a row with a SQL operation to a column-oriented database requires about one second. About 500 milliseconds is used to initiate the operation. The actual operation requires about one millisecond. Another 500 milliseconds is used to terminate the operation. On the other hand, inserting 10,000 rows requires about ten seconds at one millisecond per row. That is an average of 1.1 milliseconds per row when the one second of overhead is added as compared to 1,001 milliseconds per row for a single insert. Hence, modifying the column-oriented database with large batches typically is quite efficient. Modifying it with small batches typically is quite inefficient.

In the prior art, a database update operation to a row typically is converted to a delete followed by an insert for that row. However, there also may be an insert of a row followed by a later delete of that row. It is therefore important that deletes be executed in the proper order with respect to inserts. For instance, consider a delete/insert pair that has replaced an update. The delete must be executed first, followed by the insert. If the order is reversed (insert followed by delete), the insert will fail (or will be converted to an update) because the row already exists. Rather than updating the row, the row will be deleted.

On the other hand, consider an insert of a row followed by a later delete of that row. In this case, the insert must be executed prior to the delete. Otherwise, if the delete is executed first, it will fail because there is no such row to delete. The insert will succeed, leaving the row in the database rather than deleting it.

A typical prior-art architecture for updating a column-oriented database is shown in FIG. 15. Each change that is received (1) is a row of the database data. New insert, update, and delete changes are batched in time-sequenced order as rows in a Change Table (2) stored in a Write-Only Store (3) that is separate from the column-oriented database (4). The primary change activities are new inserts arriving for insertion into the column-oriented database (5). If a delete operation is received (6), it is stored in the Write-Only Store in the order in which it was received. If an update operation is received (7), it is stored as a delete followed by an insert in the order in which it was received.

Periodically, the changes that have accumulated in the Write-Only Store are moved (8) to the column-oriented database. Consecutive inserts are moved as a batch (9) to the column-oriented database. However, if one or more deletes are reached, the insert batch is terminated; and the delete(s) must be applied to the column-oriented database (10). The insert batch update then can be continued (11).

The result is that the batch movement of inserts is less efficient because the insert batch sizes are reduced by the interspersed deletes. These typically will be single deletes requiring about one second to modify the column-oriented database. Consequently, a large batch modification of the column-oriented database could potentially be extended from seconds to minutes. For instance, a batch move of 10,000 inserts might take eleven seconds, including overhead. However, if there were 100 deletes interspersed among those 10,000 inserts, the batch movement time would be extended to 211 seconds (i.e., one additional second of overhead for each delete plus one additional second of overhead for each insert batch), or about three and a half minutes).

1.12 What Is Needed

What is needed is a way to more efficiently synchronize a column-oriented target database with changes presented as rows from a row-oriented source environment while optionally preserving strict, loose, or relaxed consistency.

BRIEF SUMMARY OF THE INVENTION

The purpose of the present invention is to increase the efficiency and performance of applying changes to column-oriented databases while optionally preserving strict, loose, or relaxed consistency using the various methods described.

One method does this by eliminating what in the current art is the need to break insert batches into multiple batches separated by delete operations. Instead, the method employs loose-loading consistency to the column-oriented database to achieve very fast loading and synchronization. If the loading is performed on transaction boundaries, the column-oriented database always will be consistent; though it may be stale.

More efficient synchronization is accomplished by eliminating the need to intersperse the update and delete activities with the string of inserts that are to be applied to a column-oriented database. Such a method allows all inserts that have accumulated to be moved to the column-oriented database in one large batch. Likewise, all updates and deletes that have accumulated are moved to the column-oriented database in their respective batch transfers. Thus, the update of a column-oriented database require at most three batch moves.

The method of decomposing an update operation into a delete operation followed by an insert operation reduces the number of batch moves from three to two, thus making the update of the column-oriented database even more efficient.

Furthermore, update and delete operations that affect inserts into the column-oriented database that have not yet been applied to the column-oriented database are applied in some embodiments to the waiting data to reduce the number of operations that have to be applied to the column-oriented database. This has the effect of not only reducing the time to modify the column-oriented database with the accumulated changes, but it also reduces the overhead of applying the changes because each batch of changes will contain only the changes of a given type (insert, update, or delete).

Further ordering groups the changes by incoming table/row format. This method often caches the SQL statement for reuse and requires fewer messages to send the data to the column-oriented database.

Another performance improvement method pre-converts the changes to the column database to a column-oriented format as they are being accumulated for insertion into the column-oriented database. Merging column-oriented changes with the column-oriented database typically is more efficient than merging row-oriented changes with the column-oriented database.

Changes to the column-oriented database are accumulated in a Staging Database that typically is memory-resident, The Staging Database also may be disk-based. The changes may be optionally stored in primary-key order. Deletes and updates are applied to the data in the Staging Database as they are received rather than storing them for later processing. Only if a delete or an update is for an existing row already resident in the column-oriented database and not in the Staging Database is it set aside for separate processing. Therefore, when it comes time to apply the changes to the column-oriented database, only three batches need be sent. All of the inserts can be sent as one batch, followed by the existing deletes (if any) and the existing updates (if any). Rather than having perhaps hundreds of insert batches broken up by deletes and/or updates, each carrying a one-second overhead, only three batches at most must be applied to the column-oriented database.

The result of this method can be either strict- or loose-loading consistency. The column-oriented database is updated periodically rather than in real time. However, the query consistency is independent of the method. If the query processor only uses the data in the column-oriented database, query processing exhibits loose consistency. However, if the query processor also uses the data being accumulated in the Staging Database, query processing is strictly consistent.

Note that to be loosely consistent (consistent but stale), the column-oriented database must be updated with rows on transaction boundaries. Assume that the column-oriented database begins in a consistent state. If the update batch of inserts/updates/deletes begins and ends on a transaction boundary, and if the insert/update/delete data is locked until the apply is completed and then unlocked all at once, any query on the column-oriented database will be strictly consistent. Thereafter, it will be loosely consistent (consistent but stale).

A problem with loose consistency and strict consistency is that data items in the column-oriented database are locked until transactions commit. The locking can have a negative performance impact on queries, as they may have to wait for the locks to be removed before they can proceed. An alternative method provides relaxed consistency. With relaxed consistency, the column-oriented database need not be consistent while transactions are being executed against it. Once the transaction updates are completed for a particular table, the locks on that table are released even though the transaction has not yet committed. Until the transaction commits, the column-oriented database is not consistent. However, it will become consistent when the transaction completes. Relaxed consistency reduces lock times and can speed up queries.

An alternative method converts the batches of row-oriented changes into batches of column-oriented changes in the Staging Database. At some point, the incoming rows must be broken up into columns to be added to the column-oriented database. This is a time-consuming process. By doing this conversion when new row changes are being accepted into the Staging Database rather than when the Staging Database batches are being applied to the column-oriented database, the speed of updating can be improved significantly. This is because all that is required to update the column-oriented database is for the columns in the Staging Database to be merged with the columns in the column-oriented database, a process that is much faster than having to break rows into their columns and then adding those columns to the column-oriented database. Presorting the column data, for example to match the sort order of the column data in the column-oriented database, can improve loading speed even more.

BRIEF DESCRIPTION OF THE DRAWINGS

Preferred embodiments of the present invention will now be described by way of example with reference to the accompanying drawings:

FIG. 1 shows a prior-art architecture of a computer application.

FIG. 2 shows a prior-art database table.

FIG. 3 shows a prior-art row-oriented Sales Table.

FIG. 4 shows a prior-art column-oriented Sales Table.

FIG. 5 shows the prior-art data required for a query.

FIG. 6 shows a prior-art query data projection.

FIG. 7 shows a prior-art bitmap index.

FIG. 8 shows the prior-art Sybase IQ PlexQ grid.

FIG. 9 shows a prior-art Sales Table.

FIG. 10 shows prior-art predicates of interest in the Sales Table.

FIG. 11 shows prior-art Teradata containers.

FIG. 12 shows the prior-art Vertica architecture.

FIG. 13 shows prior-art projections on a Sales Table.

FIG. 14 shows prior-art partitioning of data into segments on several servers.

FIG. 15 shows a prior-art method for updating a column-oriented database.

FIG. 16 shows a prior-art method for loading a target database from a source database.

FIG. 17 shows a method for synchronizing a column-oriented target database with a row-oriented source database using the present invention.

FIG. 18 shows a method for online loading of a column-oriented database from a row-oriented source database while the column-oriented database is being synchronized with the source database using the present invention.

FIG. 19 shows a method to create insert/update/delete in-memory arrays from a row-oriented source database.

FIG. 20 shows a method to create insert/update/delete flat-file arrays from a row-oriented source database.

FIG. 21 shows a method for making changes to a row-oriented Staging Database while preserving updates.

FIG. 22 shows a method for making batch changes to a column-oriented database from a row-oriented Staging Database while preserving updates.

FIG. 23 shows a method for making changes to a row-oriented Staging Database while decomposing updates.

FIG. 24 shows a method for making batch changes to a column-oriented database from a row-oriented Staging Database while decomposing updates.

FIG. 25 shows a method for making changes to a column-oriented Staging Database while preserving updates.

FIG. 26 shows a method for making batch changes to a column-oriented database from a column-oriented Staging Database while preserving updates.

FIG. 27 shows a flow chart for Algorithm 1—Preserving Updates.

FIG. 28 shows a flow chart for Algorithm 2—Decomposing Updates.

DETAILED DESCRIPTION OF THE INVENTION

Certain terminology is used in the following description for convenience only and is not limiting. The words "a" and "an", as used in the claims and in the corresponding portions of the specification, mean "at least one."

Definitions

The following definitions describe the use of certain terms in this specification and are provided to promote understanding of the present invention. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set such as Employees. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" is to be interpreted as "table and/or file."

Column—A table component that holds a single attribute, such as SALARY, of the entity set.

Field—A file component that holds a single attribute, such as SALARY, of the entity set. In this specification, the term "column" is to be interpreted as "column and/or field."

Row—A table component that represents an entity instance. It is a sequence of {column name, value} pairs usually implemented as a series of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" is to be interpreted as "row and/or record."

Database—A collection of related tables or files.

Row-Oriented Database—A database organized by rows, in which each row or a pointer to the row is usually stored in contiguous storage.

Column-Oriented Database—A database organized by columns, in which each column or a pointer to the column is usually stored in contiguous storage.

Columnar Database—A column-oriented database.

Data Object—A specific column or field in a specific row or record.

Key—One or more columns that contain a value that identifies its row in the database or another row in the database (a foreign key).

Primary Key—A key that identifies a row in a row-oriented database or a column offset in a column-oriented database. Primary keys are usually unique, as they typically identify just a single row or column value. The primary key identifies the original row that was presented as a change to a column-oriented database. The columns in the column-oriented database typically are ordered in primary-key order, although other ordering is often used (such as column-value order). The primary key is used to determine the offset of the data objects comprising a row in the columns of the column-oriented database. It is also used to reconstruct a row from the row's data objects in the column-oriented database.

Index—A collection of keys that points to rows in a table or to column positions in a column-oriented database. The rows or columns to which a subset of keys point all have a common value for one of the table fields. (for example, a department number). Each key in the index contains a value for the common field and the primary key of a row in the table with that value. Thus, the index can be used to access all of the rows or columns in the table that contain a specific value in one of the table fields.

Relative Row Number—If a primary key is not available in a row-oriented or column-oriented table, a relative row number may be provided as a unique identifier. Each new row that is inserted is appended to the end of the table with the next relative row number added as an extra column. Alternatively, the row number can be implied by the position of the row in the table.

Bitmap Index—A collection of binary pointers, each of which points to a row in a lookup table.

Lookup Table—A single-column list of a group of names or other identifiers.

Bitmap—A binary pointer in a bitmap index.

Insert—The addition of a row into a row-oriented database or into a column-oriented database.

Update—The modification of a row in a row-oriented database or in a column-oriented database.

Delete—The removal of a row from a row-oriented database or from a column-oriented database.

Change—An insert, update, or delete.

Preserving Updates—Processing updates as single operations.

Decomposing Updates—Converting updates to deletes followed by inserts.

Deconstructing Updates—Decomposing updates. In this specification, "deconstructing" is to be interpreted as "decomposing."

Data Manipulation Language (DML)—The operations that control a database's contents, such as insert, update, delete, read a row, read a record, read a column, or read a set of rows, records, or columns.

Data Definition Language (DDL)—The operations that control a database's structure, such as add or delete a column or a table.

Function—A logical implementation of a task or service.

Program—An executable set of programming code for providing a specific function or set of functions.

Executable—A program.

Process—A program running in a computer. A process provides one or more functions. One program can be spawned as multiple distinguishable processes.

Application—One or more processes cooperating to perform one or more useful functions for end users.

Operating System—A software facility that manages computer hardware resources and provides common services for application processes. Typical services include time functions, reading and writing interprocess messages, and database manipulation.

End Users—People, systems, devices, applications, or any other entity that can influence an application or can request or use the services that it provides.

Transaction—A delimited set of database operations, e.g., inserts, updates, deletes, reads, create tables, or purge tables, that are either all made or that none are made. A transaction typically is guaranteed to leave the database in a consistent state, and its results typically are guaranteed to survive system failures.

Begin Transaction—A directive that indicates the beginning of a transaction. A begin transaction directive may be explicit, or it may be implicit, such as with the first database operation for a transaction.

Begin Work—Equivalent to Begin Transaction.

Commit Transaction—A directive indicating that a transaction has successfully completed and that its changes should be made permanent.

Commit Work—Equivalent to Commit Transaction.

Abort Transaction—A directive indicating that a transaction has been unsuccessful and should be undone.

Rollback Work—Equivalent to Abort Transaction.

ACID Properties—Transactions typically maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures. In some implementations, the ACID properties may be relaxed or enforced later.

Transaction Manager—A facility for managing the updating of a database with transactions. For audited transactions, a Transaction Manager ensures that changes to a database maintain the ACID properties.

Change Log—A persistent log of all changes made to a database. A Change Log may be maintained by the application or by the Transaction Manager. The contents of the Change Log are available to repair a corrupted database. The Change Log also can act as a source of changes to a source database that are to be replicated to a target database.

Transaction Log—A form of Change Log that contains all transactions committed to or aborted from the database. A Transaction Log typically is maintained by the Transaction Manager. The contents of the Transaction Log are available to repair a corrupted database. The Transaction Log also can act as a source of transactions applied to a source database that are to be replicated to a target database.

Consistent—A database is consistent if its contents are correct at some given point in time.

Stale—A database is stale if its contents are not up-to-date.

Loose Consistency—A collection of data that is consistent or eventually consistent but may be stale.

Strict Consistency—A collection of data that is consistent and up-to-date.

Relaxed Consistency—Brief periods of inconsistency are tolerated to improve loading speed, query performance, or efficiency. As the load progresses or completes, consistency is achieved.

Eventual Consistency—A loosely consistent collection of data that becomes strictly consistent periodically when it is updated or at a time after it is updated.

Loose-Loading Consistency—The periodic loading of updates to a database so that the database is loosely consistent.

Strict-Loading Consistency—The real-time loading of updates to a database so that the database is strictly consistent.

Loose-Query Consistency—A query based on data that may be stale or loosely consistent.

Strict-Query Consistency—A query based on data that is up-to-date or strictly consistent.

Consolidated Grouping—A set of insert, update, and delete operations to be applied to a database in which unwanted operations have been removed.

Simultaneous Consolidated Grouping—Unwanted operations are removed as changes are received that eliminate the operations.

Sequential Consolidated Grouping—Changes that may remove unwanted operations are held and applied at some later time to remove the unwanted operations.

Batch—The application of a consolidated grouping of operations to a database.

Staging Database—Contains arrays of insert, update, and delete operations to be applied to a database. The arrays are consolidated groupings of operations. A Staging Database may be row-oriented or column-oriented.

Loading—The copying of the contents of a source database to a target database so that the target database is an exact duplicate of the source database.

ETL Facility—A loading facility for extracting rows from a source database, transforming the rows to the schema of a target database, and loading the rows into the target database.

Synchronization—The replication of changes that are being made to a source database to a target database to keep the databases identical, though the data in the target database may be stale for a brief duration of time.

Online Loading—The loading of a target database from a source database while simultaneously keeping the target database synchronized with the source database.

2 Detailed Description

The present invention is a method for synchronizing a column-oriented target database with a row-oriented source database. It overcomes the inefficiency of the prior art by ensuring that large batches of insert operations are not interrupted by update or delete operations.

In an alternative embodiment, the present invention teaches a method for synchronizing a column-oriented target database with a column-oriented source database while overcoming the efficiencies of the prior art.

2.1 Initial Loading of the Column-Oriented Target Database

In order for a target database to be synchronized with a source database using the present invention, the target database first must be loaded with the contents of the source database. As shown in FIG. 16, this typically is done via an Extract, Transform, and Load (ETL) facility that reads rows from the source database, makes any data transformations on the rows to match the schema of the target database, and then applies the transformed rows to the target database.

Once loaded, the column-oriented target database can be kept synchronized with the row-oriented source database via the present invention as shown in FIG. 17. As changes are made to the row-oriented source database, the changes are entered into the source-side Change Log (if the changes represent transactions, the transactions are entered into a Transaction Log by the source-side Transaction Manager). A replication engine, such as the Shadowbase® replication engine commercially from Gravic, Inc., of Malvern, Pa., U.S.A., reads the changes from the Change Log or the transactions from the Transaction Log and sends them over a communication channel (if the source and target databases are on different systems) to the target system. There, the changes or transactions are entered into a Staging Database as consolidated groups of inserts, updates, and deletes. Periodically, the insert, update, and delete batches contained in the Staging Database are applied to the column-oriented target database.

The loading of a column-oriented target database and its synchronization with a row-oriented source database can be accomplished simultaneously via a process called online loading, as shown in FIG. 18. The loading of the target database is first begun via the ETL facility. Then the synchronization of the target database is begun according to the present invention. Thus, initial values from the source system and changes made to the source system are being sent simultaneously to the target system. A synchronizer at the source system ensures that no changes are accepted for application to the target system unless the original values for those rows have already been applied. Early changes are rejected. Changes to initial values (or subsequently changed values) at the target database are accepted. An example of such a synchronizer is SOLV commercially available from Gravic, Inc., of Malvern, Pa., U.S.A.

2.2 The Column-Oriented Database Challenge Addressed by the Present Invention

Operational databases are organized as rows. It is very efficient to insert, update, and delete rows in a row-oriented database since only the affected rows need be changed. This efficiency is important for a transaction-processing system that must update a database in real time so that the system can respond to queries with up-to-date data. Queries handled by transaction-processing systems typically only span a limited set of rows that can be accessed efficiently via B-tree secondary indices.

However, operational database queries that require access to a large number of rows (perhaps thousands, millions, or more) are very inefficient. Not only must a large number of rows be read, and these reads may be random reads as the desired data may not be collocated, but also all of the attributes (columns) in the rows must be read even though perhaps only a few are needed.

This is the advantage of a column-oriented database. Only the columns required for the query need be read. Since data is stored in the database as columns, large ranges of columns typically can be read with a single disk access, making column access very efficient.

However, the updating of a column-oriented database from a row-oriented operational database and maintaining consistency using prior-art techniques is very inefficient due to the drastically different structure of row-oriented databases and column-oriented databases. This is a challenge addressed by the present invention.

The method of the present invention organizes changes to a column-oriented database in such a way that the batch of inserts that have accumulated is not interrupted by delete or update operations. Therefore, an entire batch of inserts may be moved to the column-oriented database as one batch. As compared to prior-art methods, the present invention significantly increases the efficiency of column-oriented database inserts, reduces the time it takes to move inserts to the column-oriented database, and decreases the processing overhead incurred by the column-oriented database.

2.3 Creating Arrays

Inserts, updates, and deletes that are being received for insertion into a column-oriented database table are first organized into arrays in a Staging Database. These arrays periodically are moved on an individual basis to the column-oriented database. There is an insert array into which all inserts are placed, a delete array into which all deletes are placed, and an optional update array into which all updates are placed. Optionally, updates may be broken into deletes followed by inserts. Each array is a consolidated grouping of its type of operation.

2.3.1 The Staging Database

The Staging Database holds the arrays that are being assembled to modify the column-oriented database. If the database comprises multiple tables, there can be a Staging Database for each table.

The Staging Database may be memory-resident or disk-resident. In either case, the Staging Database can be organized in several different ways. For instance:
  i. It can be a single data structure containing the insert/update/delete arrays for all tables.
  ii. It can be three data structures—an insert array, an update array, and a delete array—each containing the arrays for all tables.
  iii. It can be three data structures for each table—an insert array, an update array, and a delete array.

In all cases, the update array is optional.

2.3.2 Controlling Consistency

It is a purpose of the present invention to control the consistency of the column-oriented database. The column-oriented database should be either loosely consistent (correct but stale) or strictly consistent (correct and up-to-date). However, for performance purposes, the column-oriented database may also exhibit relaxed consistency.

Consistency control is accomplished by updating the column-oriented database on transaction boundaries. As a transaction completes, the inserts, updates, and deletes included within the scope of the transaction are added to the Staging Database. By ensuring that changes of only complete transactions are added to the Staging Database and batched to the column-oriented database, the column-oriented database will be consistent. While transactions are being batched in the Staging Database, the column-oriented database will be loosely consistent. At the time that they are all applied, the column-oriented database will be strictly consistent.

Alternatively, as rows are added to the Staging Database, those rows may be locked in the column-oriented database. Therefore, any query against the column-oriented database will be consistent since rows that are being changed cannot be read by the query. When a transaction is committed, its changes are applied to the column-oriented database; and the rows are unlocked. This method provides a strictly consistent column-oriented database.

The locking of data items in the column-oriented database can affect the performance of queries, as a query may have to wait for locks to be removed before it can proceed. Changes may be added to the column-oriented database without regard to transaction boundaries to minimize lock waits. For instance, once all changes have been made to a table by a transaction, the changes for that table can be committed and their locks released, even though the transaction has not yet committed. In this case, the database generally will be inconsistent but eventually will be consistent when the transaction commits. This creates relaxed consistency.

2.3.3 The Use of SQL to Build the Staging Table

SQL may be used to add changes to the Staging Table and to apply the Staging Table to the column-oriented target database.

The first step in the method for the present invention is to create arrays of inserts, updates, and deletes as they are being made to the row-oriented database and store them in a Staging Database. There will be one set of logical or physical arrays for each table in the database. These arrays periodically will be flushed from the Staging Database to the column-oriented target database to synchronize it with the row-oriented source database.

As rows are inserted into a particular table of the row-oriented database, those rows must be inserted into the insert array for that table in the Staging Database. As rows are deleted, those rows must be inserted into the delete array for that table in the Staging Database. As rows are updated, those rows must be inserted into the update array for that table in the Staging Database. Alternatively, an update may be decomposed into a delete followed by an insert; and these are inserted into the delete and insert arrays.

The addition of a row into an insert, update, or delete array typically is accomplished via a SQL statement or similar function. If SQL is used, it requires a Prepare phase. During this phase, the structure of the data is determined from the table schema, which defines the column data types and the keys comprising the table. This information is used to build insert, update, and delete structures for the arrays. A SQL statement such as INSERT, UPDATE, or DELETE then is called with a "handle" pointing to the Prepare information so that the statement knows the structure of the data with which it is dealing.

One problem with the Prepare statement is that it places a significant load on the computing facilities as it is itself compute-intensive. It is therefore important to minimize the need to Prepare statements—in other words, Prepare once, execute many. That is, a given row format should require only one Prepare statement; and the result of that Prepare statement should be used for all further SQL statements on that row for all operations (insert, update, delete).

This is particularly important with respect to data changes being received in the Staging Database via SQL statements. This working set of data exhibits temporal data locality. That is, it may be frequently updated or deleted while it is in the Staging Database. Thus, Prepare statements must be reusable so that they do not need to be repeatedly recreated.

A challenge arises in that the Prepare statement is dependent upon the order of the columns in a row. If a row is presented for insert into a list, and if its columns are different or are in a different order than the Prepare statement that is being used, a new Prepare statement must be created. This requires the list that had been in the process of being created to be flushed to the column-oriented database and a new list begun. The flush of a list to the column-oriented database is very inefficient, and it is the purpose of this invention to minimize flushing to greatly improve the efficiency of column-oriented database updating.

Therefore, it is important that all rows representing changes to a database table always be presented in the same column-oriented format so that the same Prepare statement can be used for all executions. The present invention accomplishes this via the following procedures:

i. The columns for each changed row that is submitted for inclusion in an insert, update, or delete array are sorted into a common order. This may be alphabetically based on the column name, it may ordinal, or it may be some other sorting scheme. Ordinal sorting is the row order that is contained in the schema for the table.

ii. Missing columns optionally are created in the submitted row and are filled in with values:
   For a row that is to be inserted, missing columns are filled in with default values.
   For a row that is to be updated, missing columns are filled in with Col=Col, i.e., preserve the current value of the column.
   For a row that is to be deleted, if a primary key or unique key is provided, that key can be used to determine the row to be deleted. Otherwise, a SQL WHERE clause or equivalent can be used to set the value of each column equal to the columns of the row to be deleted as determined by the before image of the source row (i.e., the row's contents before it was deleted).

By using these methods, all changed rows from a table of the row-oriented source database are submitted for inclusion in one of the arrays in the Staging Database to be used to modify the column-oriented target database and can use the same Prepare statement. There is no need to execute further Prepare statements for a table in the row-oriented database; therefore, there is no need for premature flushes to the column-oriented database.

In an alternative embodiment, nothing need be done. The rows containing the changes are used in the format in which they are received.

If the database management system supports "similar" Prepare statement executions (for example, where missing columns automatically are ignored for an update statement), some of this preprocessing can be relaxed (e.g., removing Col=Col for missing columns in an update).

Similarly, if the DBMS has a fast, efficient, and large cache for Prepare statements, the above processing can be avoided as Prepare statements can be quickly and efficiently changed from one format to another by replacing them with a different Prepare statement stored in cache.

2.3.4 The Use of SQL to Batch Update the Target Database

Likewise, a SQL statement may be used to apply the Staging Database to the column-oriented target database in a batched manner if the target database provides a SQL batch update facility. A separate Prepare statement may have to be constructed to implement this operation. If the Prepare statement can be cached, it can be reused for every batch move of the Staging Database to the target database.

2.3.5 The Use of an API to Build the Staging Table and to Batch Update the Target Database If SQL operations are not available to build the Staging Database, or if the column-oriented target database does not provide a SQL batch update operation, then special APIs may be used. They may either be provided by the existing database manager, or they may be specially implemented for this purpose.

2.3.6 Creating the Staging Database

There are many means that can be used to create the insert, update, and delete arrays for a table in the Staging Database. One method by which to do this is to employ a prior-art data replication engine. The Shadowbase data replication engine, commercially available from Gravic, Inc., Malvern, Pa., U.S.A., is used here as an example. However, any data replication engine, whether commercially available or specially developed, can be used, as can other source data extract methods such as copy, unload, or export. The Shadowbase data replication engine reads changes from a change log or data from a source file or table and sends the changes to another database or application that may be on the same system or on another remote system.

Shown in FIG. 19 and FIG. 20 are examples of normal transaction data processing. An application (1) applies changes (2) to the application's database (3). These changes are captured in a change log (4); or alternately the changes may be captured by database triggers, application logging, or other methods. The Shadowbase replication engine (5) reads the changes from the change log and creates the Staging Database as in-memory arrays (6—FIG. 19) or as flat files on disk (7—FIG. 20). The contents of the Staging Database will be loaded into the column-oriented target database, as described in Section 2.4.1, "Algorithm 1—Preserving Updates" and Section 2.4.2, "Algorithm 2—Decomposing Updates."

According to a predetermined condition, such as when a specified number of inserts have been added to the Insert Table, when a preconfigured timeout has occurred, when there is no more data to process, when a specified time of day has been reached, or when all transactions have ended, the insert, update (if any), and delete arrays are applied to the column-oriented database via whatever facility is provided to accept new data. This may be undertaken, for instance, via a SQL INSERT statement if it is supported by the column-oriented database.

FIG. 19 and FIG. 20 show two alternative methods for creating the arrays for the Staging Database. In one method, shown in FIG. 19, the arrays are stored as in-memory arrays. There will be two or three such arrays depending upon whether or not updates are replaced by delete/insert pairs. One array will contain all of the inserts that were in the change log. Another array will contain all of the deletes. A third array may contain all of the updates if they had not been decomposed into delete/insert pairs. Alternatively, one array may contain all two or three operation types for each or for all tables. Special algorithms described later in the Section 2.4.1, "Algorithm 1—Preserving Updates," and Section 2.4.2, "Algorithm 2—Decomposing Updates," may modify the contents of these arrays to make loading more efficient.

In another method, depicted in FIG. 20, the arrays are written to disk as flat files (for instance, as comma-separated-value, or CSV files). There will be two or three such files depending upon whether or not updates are replaced by delete/insert pairs. One file will contain all of the inserts that were in the change log. Another file will contain all of the deletes. A third file may contain all of the updates if they had not been decomposed into delete/insert pairs. Alternatively, one file may contain all two or three event types for each or for all tables. Special algorithms described later in the Section 2.4.1, "Algorithm 1—Preserving Updates," and Section 2.4.2, "Algorithm 2—Decomposing Updates," may modify the contents of these files to make loading more efficient.

The methods shown in FIG. 19 and FIG. 20 for creating arrays as in-memory arrays or as flat files apply to a single table in the database. Typically, a database comprises multiple tables with different formats. Therefore, the Shadowbase replication engine will read changes for each table in the database from the change log and will feed the changes to the arrays or batch files dedicated to that table. The configurations shown in FIG. 19 or FIG. 20 are replicated for each table in the database; or, as an alternative embodiment, one array may hold all of the changes for a particular table or for all tables.

The arrays stored in the in-memory arrays or in the flat files for each database table constitute the Staging Database. If the arrays are stored as in-memory arrays, they may be moved to the column-oriented database via ODBC (Open Database Connectivity) or JDBC (Java Database Connectivity) commands or via another high-performance API. If the arrays are stored as flat files resident on disk, they may be moved to the column-oriented database via a SQL Load or similar command. Using in-memory arrays is typically faster than using flat files and therefore is the preferred method.

2.4 Updating the Column-oriented Database

Two algorithms for updating the column-oriented database are described below.

2.4.1 Algorithm 1—Preserving Updates

One method taught by the present invention to update a column-oriented database is shown in FIG. 21 and FIG. 22. As shown in FIG. 21, changes to be made to the column-oriented database for each table are moved by the Shadowbase replication engine into a row-oriented Staging Database (1). If the column-oriented database includes multiple tables, there typically will be one Staging Database for each database table. However, the changes for all tables may be included in one Staging Database.

In the preferred embodiment of the present invention, inserts, updates, and deletes in the Staging Database are stored in their respective arrays in primary key order, as shown in FIG. 21. There are many alternative methods: for example, one alternative method is to store them in the sequence in which they are received. Another alternative is to store the operations in a single table, with a column identifying the type of operation. In any embodiment, rows in an array may be subsequently removed or overlaid based upon subsequent operations against the same row.

In the preferred embodiment of the present invention, inserts to the column-oriented database are stored in the Insert Table (2) in the order of their primary keys (3). Furthermore, only inserts to the column-oriented database are stored in the Insert Table. Inserts are not interspersed with delete or update operations.

To maintain consistency of the column-oriented database, the changes that are moved to the Staging Database may be entire transactions. It is possible that a transaction will eventually abort. If its operations have gone into the Staging Database as DO events, the abort will result in UNDO events removing the DO events. Unlike the prior art, the present invention does not require updates to the column-oriented database to wait for a transaction commit or abort. Rather, updates can proceed as they are received during a transaction. The database will become consistent following the commit or abort of the transaction. The wait for full consistency can be relaxed.

One of the column-oriented database characteristics of which the present invention takes advantage is that column-oriented databases can be used for applications such as data warehouses. Data warehouses store historical information that can be queried. Consequently, after a short period of time, it is unlikely that there will be many changes to data already stored in the data warehouse. Changes made most likely will be applied to recent data that just has been added to the working set in the Staging Database. This working set exhibits temporal data locality in that the data objects in the working set may be changed frequently before they are added to the column-oriented database. Therefore, it is quite possible that data to be modified still is resident in the working set stored in the Staging Database when subsequent changes to that data occur.

The aforementioned characteristic is used to advantage to eliminate the bulk of delete and update changes that must be made to the column-oriented database. As indicated above, when an insert into the column-oriented database is received (4), it is inserted into the Insert Table in primary-key order. If an update operation is received (5) for a row that currently is in the Insert Table, the Insert Table row data is replaced with the new values contained in the update. If a delete operation is received (6) for a row that currently is in the Insert Table, that row is removed from the Insert Table. These update and delete operations do not have to be stored for later application to the column-oriented database, as is the case in the prior art. Thus, the tables in the Staging Database are consolidated groupings of changes—that is, all unwanted operations have been removed.

However, if an update operation is received (7) for a row that is not in the Insert Table, it must be for a row that already exists in the column-oriented database and must be applied to that database. Such an update is stored in the Existing Update Table (8). Likewise, if a delete operation is received (9) for a row that is not in the Insert Table, it must be applied to the existing row in the column-oriented database. Such a delete is stored in the Existing Delete Table (10) (only the primary key of the row to be deleted need be stored). If the delete is for an update stored in the Existing Update Table, the row in the Existing Update table is deleted (11). The delete operation remains stored in the Existing Delete Table because there is an existing row in the column-oriented database that must be deleted.

FIG. 21 shows a partially filled row-oriented Staging Database prior to receiving certain changes (1*a*) and its contents following the application of those changes (1*b*).

According to alternative embodiments of the invention, various criteria may be used to determine when the changes that have accumulated in the row-oriented Staging Database will be applied to the column-oriented database. For example:

i. when a preconfigured timeout has occurred (e.g., 30 seconds, one hour).
    ii. time of day (e.g., end of business day, close of markets, midnight).
    iii. a Change Log boundary (e.g., a specified number of events has been entered).
    iv. a Transaction Log boundary (e.g., on every commit, on every n commits).
    v. when there is no more data to process.
    vi. when all transactions have ended.

When the time comes to apply the changes, the changes that have accumulated in the row-oriented Staging Database are applied (12) to the column-oriented database (13) in a batched manner, as shown in FIG. 22. First, the Insert Table is applied as a batch operation to the column-oriented database. Next, the Existing Delete Table, if not empty, is applied as a batch operation. Finally, the Existing Update Table, if not empty, is applied as a batch operation to the column-oriented database. These apply operations may be accomplished by whatever facility is provided by the column-oriented database to accept new data. It may be undertaken, for instance, via an array-style SQL INSERT statement if it is supported by the column-oriented database.

FIG. 22 shows the original contents of the column-oriented database (13a) before the changes in the Staging Database are applied and the contents after the changes are applied (13b).

The proper order of deletes with respect to the other operations is not as important in this implementation as it is in the prior-art implementations. There are no deletes that will affect new inserts—the deletes already have been executed. Nor are there any deletes that affect rows being updated—the updates to these rows have been deleted. The only deletes are to column-oriented database rows that are otherwise unaffected by the current activity in the Staging Database and that must be deleted. Therefore, the insert, update, and delete batches can be executed in any order.

Holding locks on the affected target data in the column-oriented database until all batches have been applied preserves strict consistency. Otherwise, relaxed consistency is achieved which will lead to eventual consistency.

It may be that the column-oriented target database is not exactly synchronized with the source database. In this case, some operations may fail unless other action is taken. One method to handle such errors is fuzzy replication. For example, if an insert fails because of a duplicate key error, convert the insert to an update. It an update fails because the row is not found, convert the update to an insert. If a delete fails because the row is not found, discard the delete.

The selection of the preconfigured timeout or insert count, the time of day, the wait for all transactions to end, or the wait for when there is no more data to process determines when the batch changes will be applied to the column-oriented database. This controls the level of loose consistency of the column-oriented database prior to its being updated and brought into a strictly consistent state.

2.4.1.1 Improvements in Efficiency

The organization of the Staging Database described above results in at most three batches to move to the column-oriented database—the inserts, the existing updates, and the existing deletes. In many cases, there may be only one batch to move—the insert batch—if no existing updates or deletes have been received or if they have been optimized out and eliminated.

Consequently, using our previous example and in the worst case, there will be three impositions of a one-second overhead time on the column-oriented database—one for each batch. Assuming that there are few if any existing updates or existing deletes, the batch update time will be three seconds or less for the overhead associated with the three batches plus the time to move the inserts. At one millisecond per insert, the worst case for a batch of 10,000 inserts is only thirteen seconds rather than three-and-a-half minutes, as was the case in the prior-art example in Section 1.11, "Updating a Column-Oriented Database."

Further improvements in efficiency can be obtained by sending the existing delete and existing update batches to the column-oriented database less frequently than the insert batch updates. This procedure can reduce significantly the overhead on the column-oriented database. For instance, if the existing delete and existing update batches are sent with only one of every ten of the insert batches, their overhead is reduced from two seconds to 0.2 seconds per insert batch. The downside of this technique is consistency. The column-oriented database is marginally inconsistent during the time that the existing deletes and existing updates are being held.

2.4.2 Algorithm 2—Decomposing Updates

Another method taught by the present invention to update a column-oriented database is shown in FIG. 23 and FIG. 24. This algorithm is similar to Algorithm 1 except that updates to existing rows in the column-oriented database are decomposed into deletes followed by inserts. That is, in order to update an existing row, that row is first deleted. Then the new value of the row is inserted.

As shown in FIG. 23, changes to be made to the column-oriented database for each table are moved by the Shadowbase replication engine into the Staging Database (1). If the column-oriented database includes multiple tables, there typically will be one Staging Database for each table. Unlike the Change Table described previously for the prior-art (see Section 1.11, "Updating a Column-Oriented Database"), in which all inserts, deletes, and updates are stored in time-sequenced order in the Change Table, inserts to the column-oriented database are stored in the Insert Table (2) in the order of their primary keys (3). Furthermore, only inserts to the column-oriented database are stored in the Insert Table; inserts are not interspersed with delete or update operations. Updates are decomposed into inserts and deletes, and deletes are stored in a separate table.

One of the table characteristics of which the present invention takes advantage is that column-oriented tables can be used for applications such as data warehouses. Data warehouses store historical information that can be queried. Consequently, it is unlikely that there will be many changes to data already stored in the data warehouse. Changes made most likely will be applied to recent data that just has been added to the working set in the Staging Database. This working set exhibits temporal data locality in that the data objects in the working set may be changed frequently before they are added to the column-oriented database. Therefore, it is quite possible that data to be modified still is resident in the working set stored in the Staging Database.

The aforementioned characteristic is used to advantage to eliminate the bulk of delete changes that must be made to the column-oriented database. As indicated above, when an insert into the column-oriented database is received (4), it is inserted into the Insert Table in primary-key order. If an update operation is received (5) for a row that is currently in the Insert Table, the Insert Table row is updated with the data from the corresponding update operation; and the update is discarded. If a delete operation is received (6) for a row that is currently in the Insert Table, that row is removed from the Insert Table; and the delete is discarded. These update and delete operations do not have to be stored for later application to the column-oriented database as is common in the prior art. Thus, the tables in the Staging Database are consolidated groupings of changes—that is, all unwanted operations have been removed.

However, if a delete operation is received (7) for a row that is not in the Insert Table, it must be applied to the column-oriented database. Such a delete is stored in the Existing Delete Table (8) in key order (this can be just the primary key of the row to be deleted). If an update operation is received (9) for a row that is not in the Insert Table, it is for a row that is already in the column-oriented database and must be applied to the column-oriented database. This is accomplished by decomposing the update operation into a delete of the designated row in the column-oriented database to be followed by an insert of the new data for that row in the column-oriented database. The delete portion of the update operation is stored in the Existing Delete Table in primary key order (10), and the insert portion of the update operation is stored in the Insert Table in primary key order (11).

If a delete should be received for a previous update of an existing row, the insert for that update is deleted from the Insert Table. Furthermore, since there is already a delete in the Existing Delete Table for that row, the new delete is discarded (a delete had been entered for the earlier update operation). If a subsequent insert should be received for an existing row that has been deleted, the insert will be put into the Insert Table in key order. The Existing Delete Table will be checked to see if there is a delete for that row (there should be, since the row must have been previously deleted if the insert is valid). If so, the delete optionally will be removed.

This last step can be combined with the insert step in a more generic way. Every time an insert for a row is received, the Existing Delete Table is always checked to see if there is a delete for the new row. If there is, the delete is removed from the Existing Delete Table.

FIG. 23 shows a partially filled row-oriented Staging Database prior to receiving certain changes (1a) and its contents following the application of those changes (1b).

According to alternative embodiments of the invention, various criteria may be used to determine when the changes that have accumulated in the row-oriented Staging Database will be applied to the column-oriented database. For example:
  i. when a preconfigured timeout has occurred (e.g., 30 seconds, one hour).
  ii. time of day (e.g., end of business day, close of markets, midnight).
  iii. a Change Log boundary (e.g., a specified number of events has been entered).
  iv. a Transaction Log boundary (e.g., on every commit, on every n commits).
  v. when there is no more data to process.
  vi. when all transactions have ended.

When the time comes to apply the changes, the changes that have accumulated in the Staging Database are applied (12) to the column-oriented database (13) in a batched manner, as shown in FIG. 24. First, the Existing Delete Table, if not empty, is moved as a batch operation to the column-oriented database. Next, the Insert Table is moved as a batch operation. These moves may be accomplished by whatever facility is provided by the column-oriented database to accept new data. It may be undertaken, for instance, via a SQL DELETE statement followed by a SQL INSERT statement if they are supported by the column-oriented database.

The proper order of deletes with respect to the other operations is important in this algorithm. All deletes are for existing rows in the column-oriented database and must be executed before the inserts, as a delete may have been created by an update that must be inserted after the delete. The case of an insert followed by a delete will not occur during the application of the batches to the column-oriented database since those inserts already have been deleted during the loading of the Staging Database. Deletes that are not associated with inserts are intended simply to delete an existing row in the column-oriented database, and their orders of execution typically are not important.

FIG. 24 shows the original contents of the column-oriented database (13a) before the changes in the Staging Database are applied and the contents after the changes are applied (13b).

It may be that the column-oriented target database is not exactly synchronized with the source database. In this case, some operations may fail unless other action is taken. One method to handle such errors is fuzzy replication. For example, if an insert fails because of a duplicate key error, convert the insert to an update. If an update fails because the row is not found, convert the update to an insert. If a delete fails because the row is not found, discard the delete.

The selection of the preconfigured timeout, the time of day, the insert count, completion of work, or completion of transactions that determines when the batch changes will be applied to the column-oriented database controls the level of loose consistency of the column-oriented database prior to its being updated and brought into a strictly consistent state. Another factor in consistency is the extent to which locks are held across all batched transactions or are released prematurely for performance purposes.

2.4.2.1 Improvements in Efficiency

The organization of the Staging Database described above results in at most two batches to move to the column-oriented database—the existing deletes and the inserts. In many cases, there may be only one batch to move—the insert batch—if no existing deletes have been stored.

Consequently and in the worst case, there will be two impositions of a one-second overhead time on the column-oriented database—one for each batch. Assuming that there are few if any existing deletes, the batch update time will be two seconds or less for the overhead associated with the two batches plus the time to move the inserts. The worst case for a batch of 10,000 inserts at one millisecond per insert is then twelve seconds rather than thirteen seconds for Algorithm 1 or three-and-a-half minutes as was the case in the prior-art example in Section 1.11, "Updating a Column-Oriented Database."

Further improvements in efficiency can be obtained by sending the existing delete batches to the column-oriented database less frequently than the insert batch updates. This procedure can reduce significantly the overhead on the column-oriented database. For instance, if the existing delete batches are sent with only one of every ten of the insert batches, their overhead is reduced from one second to 0.1 seconds per insert batch. The downside of this technique is consistency. The column-oriented database is marginally inconsistent during the time that the existing deletes are being held.

2.4.3 Updating a Column-Oriented Target Database from a Column-Oriented Source Database The same methods described in Algorithm 1 and Algorithm 2 described above in Sections 2.4.1 and 2.4.2 for updating a column-oriented target database from a row-oriented source database apply equally well to the updating of a column-oriented target database from a column-oriented source database. It remains important to update the column-oriented target database with consolidated groupings of inserts, updates, and deletes to avoid the inefficiencies of batch transfers.

If the source database is column-oriented, changes made to it are sent to a row-oriented Staging Database as shown in FIG. 21 or FIG. 23 or to a column-oriented database as shown in FIG. 25. At the appropriate time, the Staging Database is applied as two (decomposing updates) or three (preserving updates) batches of consolidated groupings of changes to the column-oriented target database, as shown in FIG. 22, FIG. 24, or FIG. 26.

2.4.4 Simultaneous versus Sequential Consolidated Grouping

In the descriptions of the algorithms above, changes being received for entries currently in the Staging Database are applied immediately to update the existing entries. This is simultaneous consolidated grouping.

In an alternative embodiment, incoming changes can be stored in the Staging Database whether or not they affect entries that are already in the Staging Database. At some later time, for instance just before the Staging Database is applied to the column-oriented target database, the entries in the Staging Database are parsed and its operations consolidated by applying later changes to earlier entries. This is sequential consolidated grouping.

2.5 Queries

By applying changes to the column-oriented database on transaction boundaries, the column-oriented database will always be loosely consistent. However, the Staging Database can be included in queries executed against the column-oriented database. In this way, the result will be real-time query processing that includes all activity up to the time of the query. Thus, the queries will exhibit strict consistency.

2.6 Using a Column-Oriented Staging Database

The above descriptions have illustrated methods to update a column-oriented database from a row-oriented Staging Database by using arrays of rows to be inserted, updated, or deleted in the column-oriented database. An alternative method that may be significantly more efficient is to create the Staging Database arrays in a column-oriented format rather than in a row format. In this case, the Staging Database is column-oriented, as shown in FIG. 25 and FIG. 26.

In this embodiment, as shown in FIG. 25, the insert, delete, and update (if any) arrays are stored in the Staging Database (1) as columns rather than as rows. It requires rows that are to be inserted, updated, or deleted to be decomposed into their column values; and each column value must be added into the appropriate position in the corresponding column in the Staging Database.

The position of new column values in the column-oriented Staging Database may be in arrival order. Other ordering may be used. For example, the position of new column values to be added to the Staging Database columns from an incoming row may be sorted according to the primary key. The primary key is a unique column value (or unique value of a set of columns) that is contained in the incoming row. Containing the primary key will be a corresponding column (or set of columns) in the Staging Database's columns. The insert, delete, and update (if any) arrays are maintained in primary-key order. If there is no primary key, a relative row number from the source data may be used instead. Alternatively, the column data may be ordered according to the data item values in some specified column.

The primary key (3) is used to determine the offset into the columns in the column-oriented Staging Database corresponding to the incoming row. If the incoming row is an insert into the column-oriented database (4), the column values of the incoming row are inserted into this column-oriented offset in the Insert Table (2).

If the incoming row is an update, if updates are being preserved, and if the primary key of the incoming row exists in the Staging Database, the column values of the incoming row will replace the column values in the Staging Database columns (5) (if a column is Col=Col, the column value in that column of the Staging Database remains unchanged). If the primary key of the incoming row does not exist in the Staging Database, the column values of the incoming update row will be entered into the Existing Update Table (7, 8).

If the incoming row is a delete, and if the primary key of the incoming row exists in the Staging Database, the column values corresponding to that row in the column-oriented Staging Database will be removed (6). If the primary key of the incoming row does not exist in the Staging Database, the column values or alternatively just the primary key value of the incoming row will be entered into the Existing Delete Table (9, 10). If the delete is for an entry in the Existing Update Table, that entry in the Existing Update Table is deleted (11). The delete can be discarded since there will already be a delete for that row in the Existing Delete Table (it had been inserted when the existing update had been processed).

FIG. 25 shows a partially filled column-oriented Staging Database prior to receiving certain changes (1a) and its contents following the application of those changes (1b).

Entering insert, update, and delete rows into a column-oriented Staging Database requires a little more work than entering the rows into a row-oriented Staging Database. The column values of the incoming row must be individually entered into the columns of the column-oriented Staging Database arrays rather than just entering the entire row intact into the appropriate array of a row-oriented Staging Database. However, this activity does not affect the performance of updating the column-oriented Staging Database since the update of the Staging Database is being accomplished as new data is received from external sources and before the insert, delete, and update arrays are merged into the column-oriented database.

The major performance enhancement comes when a batch of arrays is flushed to the column-oriented database, as shown in FIG. 26 (12). Now, rather than having to break the rows in the insert, delete, and update arrays into columns and inserting, updating, or removing each column value individually in the columns of the column-oriented database, the change data already is broken into columns. All that needs to be done is to merge the columns in the Staging Database with the columns in the column-oriented database, a procedure that typically is significantly faster. Expending the effort to create a column-oriented Staging Database in advance of the flush of the arrays to the column-oriented database replaces individual column value updates with an efficient merge of columns. What results is a significant reduction in the time required to update the column-oriented database.

FIG. 26 shows the original contents of the column-oriented database (13a) before the changes in the column-oriented Staging Database are applied and the contents after the changes are applied (13b).

A hybrid method is to convert only the inserts into a column-oriented array and leave the deletes and updates in row-oriented form. This variation preserves the benefit of merging a large insert array into the column-oriented database. Since there typically are only a few if any delete or update changes to be made to the column-oriented database, moving their conversions to the Staging Database typically will have little impact on performance.

One challenge with a column-oriented Staging Database occurs if one or more columns in the database are not fixed-format. That is, the length of the column values in one or more columns may vary from row to row. In this case, an appropriate offset into the columns that are not fixed-format in the Staging Database cannot simply be calculated. Rather, the entire column must be parsed to determine the appropriate location corresponding to the data in the new incoming row. Alternatively, a list of pointers to the column values can be used. In some instances, it may be possible to convert a variable-format column into a fixed-format column. For instance, if the maximum size of the variable-format column is known, all columns can be converted to fixed-format with the maximum column size.

In all of the methods described above, the columns in the Staging Database can be compressed. Since columns tend to have similar data, various compression techniques work very well and can reduce the size of the Staging Database significantly.

3 Algorithm Flow Charts

Flow charts for Algorithm 1 and Algorithm 2 are provided in FIG. 27 and FIG. 28.

3.1 Algorithm 1—Preserving Updates

Algorithm 1 manages a Staging Database that accumulates changes that are to be made as insert, update, and delete batches. Updates are preserved. The algorithm ensures that the insert batch is not interspersed with update or delete operations; it contains only insert operations. The insert batch therefore can be applied to the column-oriented database as a single batch. Update and delete operations are also each applied as a single batch, so that the update of the column-oriented database requires the application of at most three batches.

A flow chart for Algorithm 1 is shown in FIG. 27. It shows the processing of a change row received from a source database that is to be applied to the column-oriented database.

3.1.1 Insert

If the incoming change is an insert, the algorithm checks to see if the insert already exists in the Insert Table in the Staging Database. If it does exist, the original inserted change is modified with the data values of the new insert. If the insert does not already exist in the Staging Database, it is added to the Insert Table. Inserts are typically stored in the Insert Table in primary key order or in the order in which they were received.

3.1.2 Updates

For an incoming update, the algorithm determines whether the row that is being updated is in the Insert Table. If so, the update is applied to that row. Otherwise, the update is for a row that is already in the column-oriented database. The update is added to the Existing Update Table for later application to the column-oriented database.

Typically, updates are added to the Existing Update Table in primary key order or in the order in which they were received.

3.1.3 Deletes

If the incoming change is a delete, the algorithm checks to see if the row to be deleted is in the Insert Table. If so, the row in the Insert Table is removed.

If the row to be deleted is in the Existing Update Table, it is removed from that table, and the delete is added to the Existing Delete Table. The delete is meant for a column in the column-oriented database and must be applied to that database.

If the row to be deleted is neither in the Insert Table nor the Existing Update Table, then the delete operation is added to the Existing Delete Table. Typically, delete operations are added to the Existing Delete Table in primary key order. However, they may be added in any order such as the order in which they were received.

3.1.4 Consistency Control

Algorithm 1 supports several consistency levels for the column-oriented database. Supported consistency levels include strict consistency, loose consistency, relaxed consistency, and no (eventual) consistency.

If strict consistency is being used, the algorithm checks to see if the current change from the source system is a transaction commit. If so, the changes associated with that transaction are applied to the column-oriented database, and these changes are removed from the Staging Database.

If loose consistency is being used, the algorithm waits until a specified number of transactions have committed. The changes associated with those transactions are applied to the column-oriented database, and those changes are then removed from the Staging Database. While the algorithm is waiting for the specified number of transactions to commit, the column-oriented database is loosely consistent (consistent but stale). When the transactions have been applied to the column-oriented database, the column-oriented database is strictly consistent until other changes arrive.

If relaxed consistency is being used, the column-oriented database is updated with changes to tables that have been completed, even though the transaction that is making those changes has not yet committed. The changes to these tables are then removed from the Staging Database. During this time, the column-oriented database is not consistent. It is consistent with respect to a set of table changes when the transaction making those changes commits.

If no level of consistency is being enforced, the accumulation of changes in the Staging Database continues until a specified time has expired, a specified number of changes have been received and entered into the Staging Database, or some other specified condition has been reached such as a time of day (see Section 2.4.1, "Algorithm 1—Preserving Updates"). At this point, the changes that have accumulated in the Staging Database are applied to the column-oriented database, and the changes are removed from the Staging Database.

In all cases, the application of changes to the column-oriented database is accomplished by applying batches of inserts, updates, and deletes. There will be at most three batches—one containing all of the inserts, one containing all of the updates, and one containing all of the deletes. These batches may be applied in any order.

3.2 Algorithm 2—Decomposing Updates

Algorithm 2 is similar to Algorithm 1 except that an update is decomposed into a delete followed by an insert. Therefore, there is no Existing Update Table in the Staging Database; and there are only two batches that will be applied to the column-oriented database—a batch containing all of the inserts (including those for updates) and a batch containing all of the deletes (including those for updates).

Algorithm 2 manages a row-oriented Staging Database that accumulates changes that are to be made as insert and delete batches. The algorithm ensures that the insert batch is not interspersed with delete operations; it contains only insert operations. The insert batch therefore can be applied to the column-oriented database as a single batch. Delete operations are also applied as a single batch, so that the update of the column-oriented database requires the application of at most two batches—an insert batch and a delete batch A flow chart for Algorithm 2 is shown in FIG. 28. It shows the processing of a change row received from a source database that is to be applied to the column-oriented database.

3.2.1 Insert

If the incoming change is an insert, the algorithm checks to see if the insert already exists in the Insert Table in the Staging Database. If it does exist, the original inserted change is modified with the data values of the new insert. If the insert does not already exist in the Staging Database, it is added to the Insert Table. Inserts are typically stored in the Insert Table in primary key order. However, they may be added in any order such as the order in which they were received.

3.2.2 Updates

For an incoming update, the algorithm determines whether the row that is being updated is in the Insert Table. If so, the update is applied to that row. Otherwise, the update is for a row that is already in the column-oriented database. The update is decomposed into a delete followed by an insert. The insert is added to the Insert Table and the delete operation is added to the Existing Delete Table.

3.2.3 Deletes

If the incoming change is a delete, the algorithm checks to see if the row to be deleted is in the Insert Table. If so, the row in the Insert Table is removed.

Otherwise, the delete is meant for a column in the column-oriented database and must be applied to that database. The delete operation is added to the Existing Delete Table. Typically, delete operations are added to the Existing Delete Table in primary key order. However, they may be added in any order such as the order in which they were received.

3.2.4 Consistency Control

Algorithm 2 supports several consistency levels for the column-oriented database. Supported consistency levels include strict consistency, loose consistency, relaxed consistency, and no (eventual) consistency.

If strict consistency is being used, the algorithm checks to see if the current change from the source system is a transaction commit. If so, the changes associated with that transaction are applied to the column-oriented database, and these changes are removed from the Staging Database.

If loose consistency is being used, the algorithm waits until a specified number of transactions have committed. The changes associated with those transactions are applied to the column-oriented database, and those changes are then removed from the Staging Database. While the algorithm is waiting for the specified number of transactions to commit, the column-oriented database is loosely consistent (consistent but stale). When the transactions have been applied to the column-oriented database, the column-oriented database is strictly consistent until other changes arrive.

If relaxed consistency is being used, the column-oriented database is updated with changes to tables that have been completed, even though the transaction that is making those changes has not yet committed. The changes to these tables are then removed from the Staging Database. During this time, the column-oriented database is not consistent. It is consistent with respect to a set of table changes when the transaction making those changes commits.

If no level of consistency is being enforced, the accumulation of changes in the Staging Database continues until a specified time has expired, or a specified number of changes have been received and entered into the Staging Database, or when some other condition has been reached (see Section 2.4.2, "Algorithm 2—Decomposing Updates). At this point, the changes that have accumulated in the Staging Database are applied to the column-oriented database, and the changes are removed from the Staging Database.

In all cases, the application of changes to the column-oriented database is accomplished by applying batches of inserts and deletes. There will be at most two batches—one containing all of the inserts and one containing all of the deletes. The delete batch, if any, must be applied before the insert batch as it contains deletes that must be applied before the inserts for decomposed updates

4 Summary

Column-oriented databases have come to the forefront as necessary technology to analyze "big data." Massive amounts of data are subject to queries that each rely on just a few columns of the data in the database. With row-oriented databases, all columns of all rows typically must be read to obtain the data from the few columns of interest. This can be extraordinarily inefficient for very large databases.

Column-oriented databases solve this challenge. Data in these databases is organized into columns rather than into rows. An entire column of data can be read with one I/O operation. Consequently, queries depending upon the data in just a handful of columns can be executed efficiently.

On the other hand, not being row-oriented, the updating of column-oriented databases is much more complex. Most column-oriented databases have a SQL interface (via ODBC or JDBC) to insert rows, update rows, and delete rows. A single SQL statement can insert, update, or delete a batch of rows. However, each batch operation carries a great deal of overhead—on the order of one second per batch according to a recent measurement. Therefore, it is imperative to minimize the number of batch operations required to be made to a column-oriented database.

Most changes to a column-oriented database are inserts, since these databases are used primarily to save historical data. However, in the prior art, a large batch of inserts often has delete and update operations intermixed throughout. In these implementations, all operations must be performed in sequential order. The result will be a large batch of inserts broken into many smaller batches separated by delete or update operations. Since each batch carries significant overhead, a great deal of inefficiency is created for column-oriented database updating.

The present invention addresses this issue by taking advantage of the temporal data locality of the working set of data currently being held in a Staging Database. It provides a method to keep the insert batch intact and to group the delete and update operations into their own, typically smaller, batches in the Staging Database while maintaining proper execution order. The result is that the periodic updating of a column-oriented database requires at most two or three batch operations, depending upon the batching algorithm used, rather than perhaps hundreds of batch operations.

5 Hardware/Software Implementation Details

The present invention may be implemented with any combination of hardware and software. If implemented as a computer-implemented apparatus, the present invention is implemented using means for performing all of the steps and functions described above.

When implemented in software, the software code can be executed on any suitable processor or collection of processors, whether provided in a single computer or distributed among multiple computers.

The present invention can also be included in an article of manufacture (e.g., one or more computer program products)

having, for instance, computer readable storage media. The storage media has computer readable program code stored therein that is encoded with instructions for execution by a processor for providing and facilitating the mechanisms of the present invention. The article of manufacture can be included as part of a computer system or sold separately.

The storage media can be any known media, such as computer memory, one or more floppy discs, compact discs, optical discs, magnetic tapes, flash memories, circuit configurations in Field Programmable Gate Arrays or other semiconductor devices, or other tangible computer storage medium. The storage media can be transportable, such that the program or programs stored thereon can be loaded onto one or more different computers or other processors to implement various aspects of the present invention as discussed above.

The computer(s)/processor(s) used herein may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable, mobile, or fixed electronic device.

The computer(s)/processor(s) may have one or more input and output devices. These devices can be used, among other things, to present a user interface. Examples of output devices that can be used to provide a user interface include printers or display screens for visual presentation of output and speakers or other sound generating devices for audible presentation of output.

Examples of input devices that can be used for a user interface include keyboards, and pointing devices, such as mice, touch pads, and digitizing tablets. As another example, a computer may receive input information through speech recognition or in other audible format.

Such computers/processors may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

The various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

The terms "program" or "software" are used herein in a generic sense to refer to any type of computer code or set of computer-executable instructions that can be employed to program a computer or other processor to implement various aspects of the present invention as discussed above. The computer program need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, and the like, that perform particular tasks or implement particular abstract data types. The functionality of the program modules may be combined or distributed as desired in various embodiments.

Data structures may be stored in non-transitory computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Preferred embodiments of the present invention may be implemented as methods, of which examples have been provided. The acts performed as part of the methods may be ordered in any suitable way. Accordingly, embodiments may be constructed in which acts are performed in an order different than illustrated, which may include performing some acts simultaneously, even though such acts are shown as being sequentially performed in illustrative embodiments.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. An automated method for synchronizing a column-oriented target database with a row-oriented source database, wherein change data are replicated from a change log of the row-oriented source database via a staging database to the column-oriented target database, the change data including inserts and deletes, the method comprising:
   (a) reading the change data of the change log into the staging database, wherein the change data of the change log includes multiple interspersed inserts and deletes;
   (b) in the staging database consolidating and grouping the change data into (i) a consolidated grouping of only inserts for multiple rows or multiple records, and (ii) a consolidated grouping of only deletes for multiple rows or multiple records, wherein the consolidated grouping of only inserts and only deletes results in the inserts and deletes no longer being interspersed;
   (c) applying the consolidated grouping of only inserts for multiple rows or multiple records from the staging database to the target database in a batched manner, and applying the consolidated grouping of only deletes for multiple rows or multiple records from the staging database to the target database in a batched manner; and
   (d) modifying contents of the target database as a result of applying the consolidated grouping of only inserts and only deletes to the target database.

2. The method of claim 1 wherein the staging database is a column-oriented staging database.

3. The method of claim 1 wherein the staging database is a row-oriented staging database and step (c) further comprises applying the consolidated grouping of only inserts and the consolidated grouping of only deletes from the staging database to the target database in a column-oriented batched manner.

4. The method of claim 1 wherein step (c) is initiated on at least one of time of day, elapsed time, size of the staging database, and a change log boundary.

5. The method of claim 1 wherein the change log is a transaction log of a relational database system.

6. The method of claim 1 further comprising:
(d) reading data from the row-oriented source database into the staging database as inserts, and performing steps (b) and (c) on the read data simultaneously with the change data of step (a).

7. The method of claim 1 wherein the change data further includes updates, the method further comprising:
(d) deconstructing each update into an insert and a delete, wherein the grouping of the change data into a consolidated grouping of only inserts and a consolidated grouping of only deletes in step (b) includes the inserts and deletes from the deconstructed updates, and wherein step (c) further includes applying the consolidated grouping of only deletes before applying the consolidated grouping of only inserts.

8. The method of claim 1 wherein the change data further includes updates, and wherein step (b) further includes grouping the change data into (iii) a consolidated grouping of only updates, and wherein step (c) further includes applying the consolidated grouping of only updates from the staging database to the target database in a batched manner.

9. The method of claim 1 wherein steps (a) and (b) are performed sequentially.

10. The method of claim 1 wherein steps (a) and (b) are performed simultaneously for each change data event.

11. A tangible computer program product for synchronizing a column-oriented target database with a row-oriented source database, wherein change data are replicated from a change log of the row-oriented source database via a staging database to the column-oriented target database, the change data including inserts and deletes, the computer program product comprising non-transitory computer-readable media encoded with instructions for execution by a processor to perform a method comprising:
(a) reading the change data of the change log into the staging database, wherein the change data of the change log includes multiple interspersed inserts and deletes;
(b) in the staging database consolidating and grouping the change data into (i) a consolidated grouping of only inserts for multiple rows or multiple records, and (ii) a consolidated grouping of only deletes for multiple rows or multiple records, wherein the consolidated grouping of only inserts and only deletes results in the inserts and deletes no longer being interspersed;
(c) applying the consolidated grouping of only inserts for multiple rows or multiple records from the staging database to the target database in a batched manner, and applying the consolidated grouping of only deletes for multiple rows or multiple records from the staging database to the target database in a batched manner; and
(d) modifying contents of the target database as a result of applying the consolidated grouping of only inserts and only deletes to the target database.

12. The computer program product of claim 11 wherein the staging database is a column-oriented staging database.

13. The computer program product of claim 11 wherein the staging database is a row-oriented staging database and step (c) further comprises applying the consolidated grouping of only inserts and the consolidated grouping of only deletes from the staging database to the target database in a column-oriented batched manner.

14. The computer program product of claim 11 wherein step (c) is initiated on at least one of time of day, elapsed time, size of the staging database, and a change log boundary.

15. The computer program product of claim 11 wherein the change log is a transaction log of a relational database system.

16. The computer program product of claim 11 wherein the instructions for execution by the processor perform a method further comprising:
(d) reading data from the row-oriented source database into the staging database as inserts, and performing steps (b) and (c) on the read data simultaneously with the change data of step (a).

17. The computer program product of claim 11 wherein the change data further includes updates, and wherein the instructions for execution by the processor perform a method further comprising:
(d) deconstructing each update into an insert and a delete, wherein the grouping of the change data into a consolidated grouping of only inserts and a consolidated grouping of only deletes in step (b) includes the inserts and deletes from the deconstructed updates, and wherein step (c) further includes applying the consolidated grouping of only deletes before applying the consolidated grouping of only inserts.

18. The computer program product of claim 11 wherein the change data further includes updates, and wherein step (b) further includes grouping the change data into (iii) a consolidated grouping of only updates, and wherein step (c) further includes applying the consolidated grouping of only updates from the staging database to the target database in a batched manner.

19. The computer program product of claim 11 wherein steps (a) and (b) are performed sequentially.

20. The computer program product of claim 11 wherein steps (a) and (b) are performed simultaneously for each change data event.

* * * * *